(12) United States Patent
Chen et al.

(10) Patent No.: US 9,733,714 B2
(45) Date of Patent: Aug. 15, 2017

(54) COMPUTING SYSTEM WITH COMMAND-SENSE MECHANISM AND METHOD OF OPERATION THEREOF

(71) Applicant: Samsung Electronics Co., Ltd., Gyeonggi-Do (KR)

(72) Inventors: Ke-Yu Chen, Seattle, WA (US); Daniel Ashbrook, Sunnyvale, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 155 days.

(21) Appl. No.: 14/149,021

(22) Filed: Jan. 7, 2014

(65) Prior Publication Data

US 2015/0194145 A1  Jul. 9, 2015

(51) Int. Cl.
*G10K 15/02* (2006.01)
*G06F 3/01* (2006.01)
*G06F 3/038* (2013.01)

(52) U.S. Cl.
CPC .............. *G06F 3/017* (2013.01); *G06F 3/038* (2013.01)

(58) Field of Classification Search
CPC .......... G06F 3/017; G06F 3/043; G06F 3/038; G09G 5/00; H04L 65/403
See application file for complete search history.

(56) References Cited

U.S. PATENT DOCUMENTS

| 7,427,926 | B2 | 9/2008 | Sinclair et al. |
| 7,941,480 | B2 | 5/2011 | Atsmon et al. |
| 7,986,917 | B2 | 7/2011 | Ahlgren et al. |
| 8,059,111 | B2 | 11/2011 | Harrison |
| 8,312,392 | B2 | 11/2012 | Forutanpour et al. |
| 2006/0256074 | A1* | 11/2006 | Krum .................... G06F 1/1626 345/156 |
| 2007/0146347 | A1 | 6/2007 | Rosenberg |
| 2008/0039212 | A1 | 2/2008 | Ahlgren et al. |
| 2009/0017799 | A1 | 1/2009 | Thorn |
| 2010/0167646 | A1 | 7/2010 | Alameh et al. |
| 2010/0202656 | A1 | 8/2010 | Ramakrishnan et al. |

(Continued)

FOREIGN PATENT DOCUMENTS

EP  2575332 A1  4/2013

OTHER PUBLICATIONS

Kalgaonkar, K. & Raj, B., "One-Handed Gesture Recognition Using Ultrasonic Doppler Sonar", Mitsubishi Electric Research Laboratories, www.merl.com, TR2009-014, May 2009.

(Continued)

*Primary Examiner* — Lun-Yi Lao
*Assistant Examiner* — Johny Lau
(74) *Attorney, Agent, or Firm* — IP Investment Law Group

(57) ABSTRACT

A computing system includes: an input-output unit configured to identify a tone-detection result for representing a transmission tone received at a device; a control unit, coupled to the input-output unit, configured to: determine a wave-detection profile including a frequency shift based on the tone-detection result, calculate a command-movement direction based on the wave-detection profile for representing the command-movement direction relative to the device and a further device, and identify a gesture command based on the command-movement direction for operating the device relative to the further device including displaying on the device.

20 Claims, 8 Drawing Sheets

(56) References Cited

U.S. PATENT DOCUMENTS

| | | | | |
|---|---|---|---|---|
| 2012/0001875 | A1* | 1/2012 | Li | G01S 7/5273 345/177 |
| 2013/0154919 | A1* | 6/2013 | Tan | G01S 15/50 345/156 |
| 2013/0335316 | A1* | 12/2013 | Smith | G06F 3/017 345/156 |
| 2014/0149859 | A1* | 5/2014 | Van Dyken | H04L 29/08117 715/702 |
| 2014/0380187 | A1* | 12/2014 | Gardenfors | G06F 3/017 715/748 |

OTHER PUBLICATIONS

Gupta, S., Morris, D., Patel, S., & Tan, D., "SoundWave: Using the Doppler Effect to Sense Gestures", Microsoft Research, http://research.microsoft.com/en-us/um/redmond/groups/cue/publications/guptasoundwavechi2012.pdf, 2012.

* cited by examiner

COMPUTING SYSTEM WITH COMMAND-SENSE MECHANISM AND METHOD OF OPERATION THEREOF

TECHNICAL FIELD

An embodiment of the present invention relates generally to a computing system, and more particularly to a system with command-sense mechanism.

BACKGROUND

Modern consumer and industrial electronics, especially devices such as graphical computing systems, televisions, cellular phones, portable digital assistants, and combination devices, are providing increasing levels of functionality to support modern life including access to user applications. Research and development in the existing technologies can take a myriad of different directions.

As users become more empowered with the growth of computing systems, new and old paradigms begin to take advantage of this new device space. One such advancement has been accessing or controlling multiple devices. However, the rapid growth in consumer electronics and the integration of access and control across multiple devices have presented new challenges for the users.

Thus, a need still remains for a computing system with command-sense mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a computing system, including: an input-output unit configured to identify a tone-detection result for representing a transmission tone received at a device; a control unit, coupled to the input-output unit, configured to: determine a wave-detection profile including a frequency shift based on the tone-detection result, calculate a command-movement direction based on the wave-detection profile for representing the command-movement direction relative to the device and a further device, and identify a gesture command based on the command-movement direction for operating the device relative to the further device including displaying on the device.

An embodiment of the present invention provides a method of operation of a computing system including: identifying a tone-detection result for representing a transmission tone received at a device; determining a wave-detection profile including a frequency shift based on the tone-detection result; calculating a command-movement direction based on the wave-detection profile for representing the command-movement direction relative to the device and a further device; and identifying a gesture command based on the command-movement direction for operating the device relative to the further device including displaying on the device.

An embodiment of the present invention provides a non-transitory computer readable medium including instructions for operating a computing system including: identifying a tone-detection result for representing a transmission tone received at a device; determining a wave-detection profile including a frequency shift based on the tone-detection result; calculating a command-movement direction based on the wave-detection profile for representing the command-movement direction relative to the device and a further device; and identifying a gesture command based on the command-movement direction for operating the device relative to the further device including displaying on the device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
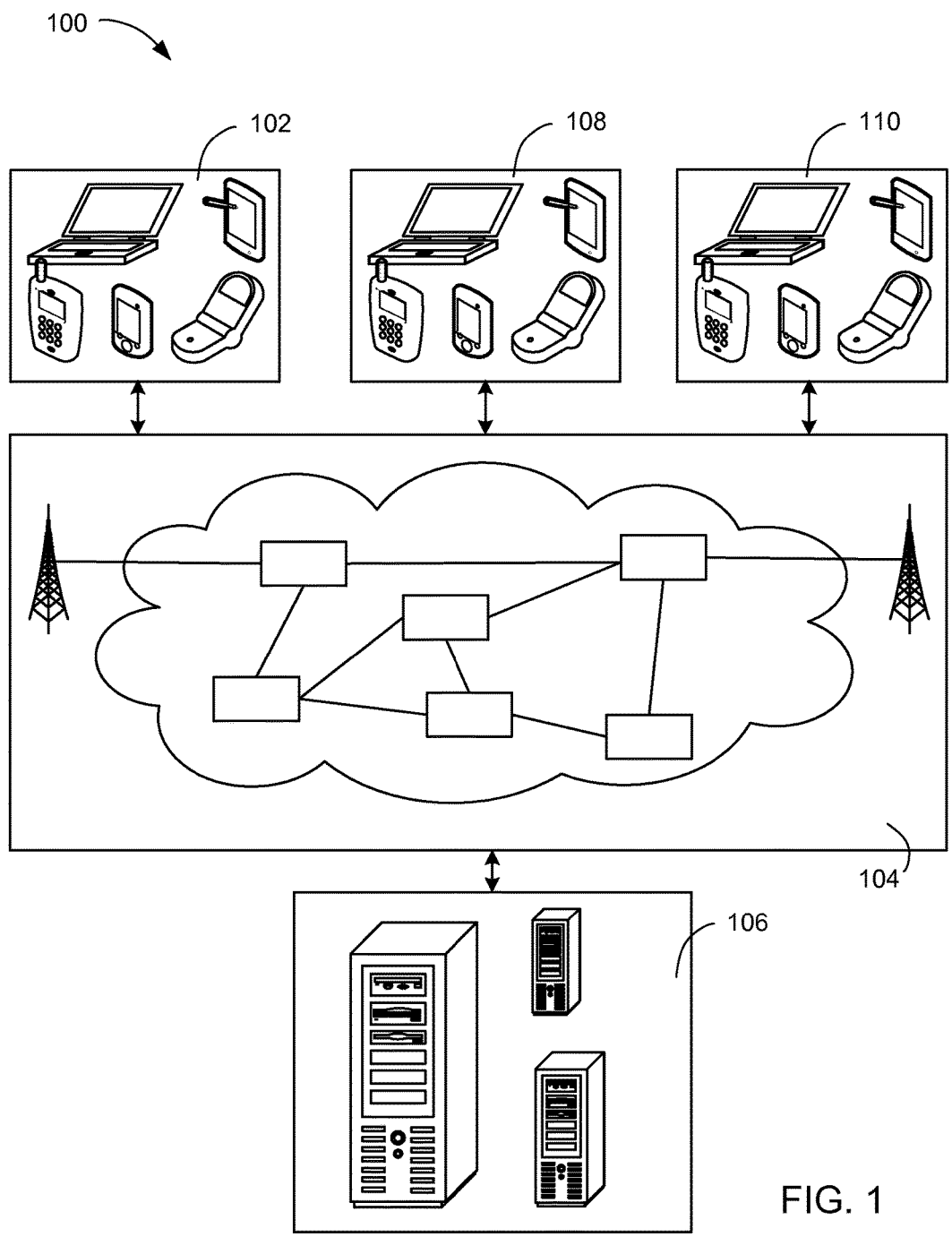
FIG. 1 is a computing system with command sense mechanism in an embodiment of the present invention.

The following embodiments of the present invention can be used to allow a user to select one or more devices and share contents with a command movement corresponding to a simple movement. To create a connection between the devices, the user can use bodily movement from his device to the other device.

The embodiments of the present invention can generate a transmission tone. The transmission tone can react to the command movement and result in a frequency shift, captured and analyzed through atone-detection result and a wave-detection profile. The embodiments of the present invention can execute a gesture command corresponding to the command movement.

The transmission tone, the frequency shift detected for representing the command movement, and the gesture command associated thereto can provide increased functionality and simpler user interface for sharing or transfer data between devices in multiple device environment. The transmission tone generated based on a contextual factor or the associated instance of the gesture context provides increased usability and increased battery life. The command-movement direction based on the wave-detection profile provides increased usability.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include or be implemented as software, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium having instructions for performing the software function, a portion therein, or a combination thereof.

The term "processing" as used herein includes filtering signals, decoding symbols, assembling data structures, transferring data structures, manipulating data structures, and reading and writing data structures. Data structures are defined to be information arranged as symbols, packets, blocks, files, input data, system generated data, such as calculated or generated data, and program data.

Referring now to FIG. 1, therein is shown a computing system 100 with command sense mechanism in an embodiment of the present invention. The computing system 100 includes a first device 102, such as a mobile device including a cellular phone or a notebook computer, connected to a network 104.

The first device 102 can be a client or a server. For example, the first device 102 can be of any of a variety of devices, such as a smartphone, a cellular phone, personal digital assistant, a tablet computer, a notebook computer, or other multi-functional display or entertainment device. The first device 102 can couple, either directly or indirectly, to the network 104 for exchanging information with other devices.

The network 104 is a system of wired or wireless communication devices that are connected to each other for enabling communication between devices. For example, the network 104 can include a combination of wires, transmitters, receivers, antennas, towers, stations, repeaters, telephone network, servers, or client devices for a wireless cellular network. The network 104 can also include a combination of routers, cables, computers, servers, and client devices for various sized area networks.

The network 104 can span and represent a variety of network types and network topologies. For example, the network 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the network 104. Ethernet, digital subscriber line (DSL), fiber to the home (FTTH), and plain old telephone service (POTS) are examples of wired communication that can be included in the network 104. Further, the network 104 can traverse a number of network topologies and distances. For example, the network 104 can include direct connection, personal area network (PAN), local area network (LAN), metropolitan area network (MAN), wide area network (WAN), or a combination thereof.

Device users (not shown) can communicate with each other or access or create information using devices including text, images, symbols, location information, and audio, as examples. The users can be individuals or enterprise companies. The information can be created directly from a user or operations performed on these information to create more or different information.

The network 104 can include a second device 106 for directly linking and communicating with the first device 102. The second device 106 can receive wireless signals from the first device 102, transmit signals to the first device 102, process signals, or a combination thereof. The second device 106 can also relay signals between other base stations, components within the network 104, or a combination thereof.

The second device 106 can be any of a variety of centralized or decentralized computing devices. For example, the second device 106 can be a multimedia computer, a laptop computer, a desktop computer, a video game console, grid-computing resources, a virtualized computer resource, cloud computing resource, routers, switches, peer-to-peer distributed computing devices, a media playback device, a recording device, such as a camera or video camera, or a combination thereof. In another example, the second device 106 can be a server at a service provider or a computing device at a transmission facility.

For illustrative purposes, the computing system 100 is described with the first device 102 as a consumer device or a portable device, and with the second device 106 as a stationary or an enterprise device. However, it is understood that the first device 102 and the second device 106 can be any variety of devices. For example, the first device 102 can be a stationary device or an enterprise system, such as a television or a server. Also for example, the second device 106 can be a consumer device or a portable device, such as a smart phone or a wearable device.

The first device 102 can connect to and communicate with other devices, such as other mobile devices, servers, computers, telephones, or a combination thereof. For example, the first device 102 can communicate with other devices by transmitting signals, receiving signals, processing signals, or a combination thereof and displaying a content of the signals, audibly recreating sounds according to the content of the signals, processing according to the content, such as storing an application or updating an operating system, or a combination thereof.

The computing system 100 can include a third device 108, a fourth device 110, or a combination thereof. The third device 108, the fourth device 110, or a combination thereof can be a client or a server. The third device 108, the fourth device 110, or a combination thereof can be similar to the first device 102, the second device 106, or a combination thereof. The computing system 100 can include a multiple device environment (MDE).

For example, the third device 108, the fourth device 110, or a combination thereof can be of any of a variety of devices, such as a smartphone, a cellular phone, personal digital assistant, a tablet computer, a notebook computer, a multimedia computer, a laptop computer, a desktop computer, a video game console, other multi-functional display or entertainment device, grid-computing resources, a virtualized computer resource, cloud computing resource, routers, switches, peer-to-peer distributed computing devices, a media playback device, a recording device, such as a camera or video camera, or a combination thereof. The first device 102, the second device 106, the third device 108, the fourth device 110, or a combination thereof can couple, either directly or indirectly, to the network 104 for exchanging information with each other or other devices.

For illustrative purposes, the computing system 100 is described with the first device 102 as a portable multi-functional device, although it is understood that the first device 102 can be different types of devices. For example, the first device 102 can also be a workstation or a multi-media presentation. A multi-media presentation can be a presentation including sound, a sequence of streaming images or a video feed, text or a combination thereof.

Also for illustrative purposes, the computing system 100 is described with the third device 108 and the fourth device 110 as personal devices, although it is understood that the third device 108, the fourth device 110, or a combination thereof can be different types of devices. For example, the third device 108, the fourth device 110, or a combination thereof can be a shared device, a public device, a corporate device assigned to an individual user or a group, or a combination thereof. Also for example, the third device 108, the fourth device 110, or a combination thereof can be owned by one user same as the first device 102 or different from the owner of the first device 102.

For further illustrative purposes, the computing system 100 is described with the second device 106 as a computing device and as a server, although it is understood that the second device 106 can be different types of devices as described above. Also for illustrative purposes, the computing system 100 is shown with the second device 106, the first device 102, the third device 108, and the fourth device 110 as end points of the network 104, although it is understood that the computing system 100 can have a different partition between the first device 102, the second device 106, the third device 108, the fourth device 110, and the network 104. For example, the first device 102, the second device 106, the third device 108, the fourth device 110, or a combination thereof can also function as part of the network 104.

Figure 2:
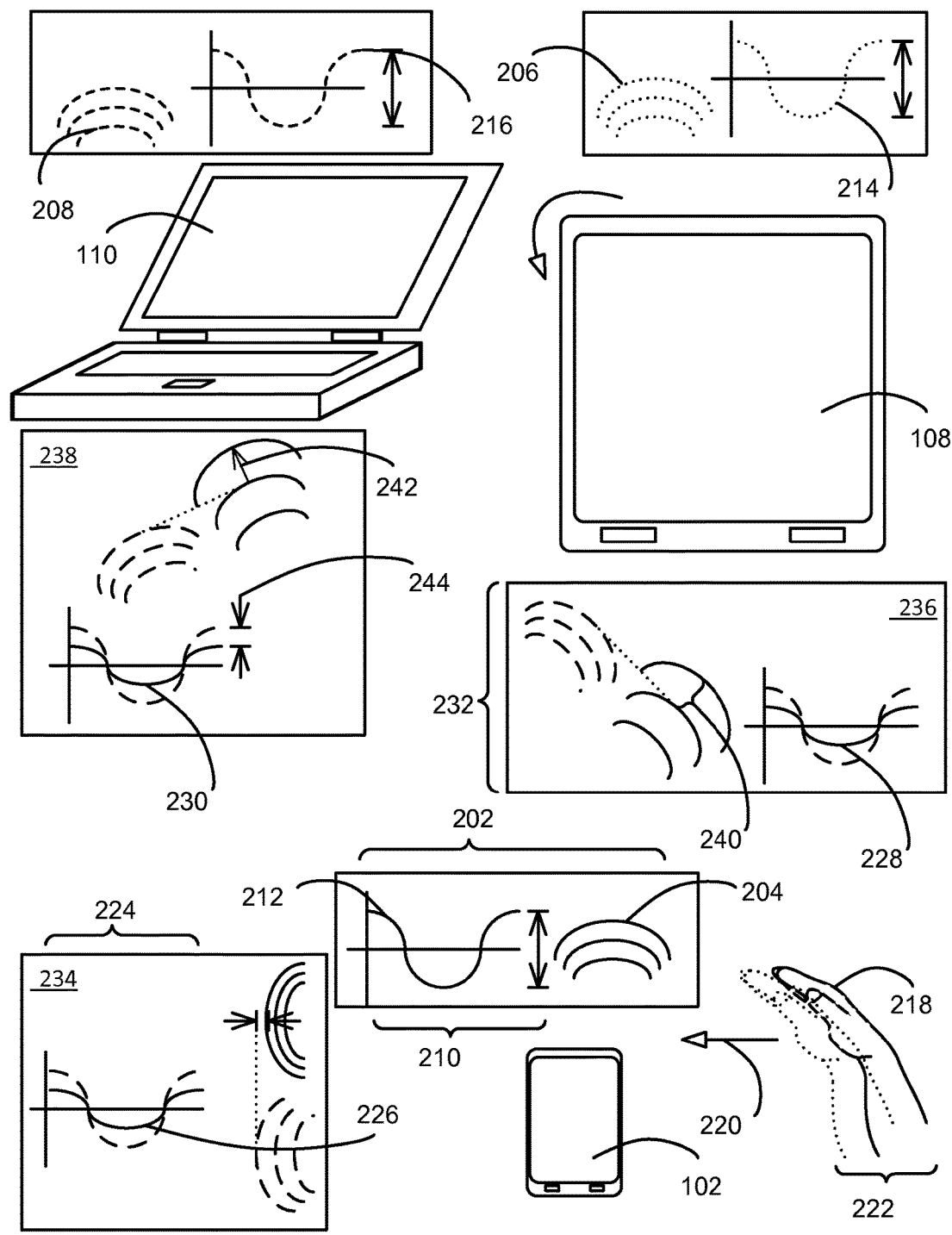
FIG. 2 is an example illustration of the computing system.

Referring now to FIG. 2, therein is shown an example illustration of the computing system 100. As an example, the computing system 100 can include the first device 102, the third device 108 to the right of the first device 102 and the fourth device 110 to the left of the first device 102.

One or more devices in the computing system 100 can generate or communicate a transmission tone 202. The transmission tone 202 is information transmitted for communication between devices using a transmission frequency, a transmission bandwidth, or a combination thereof. The transmission tone 202 can be a wave, such as for wireless signals or sounds. The transmission tone 202 can include a specific frequency for the wave.

For example, the one or more devices can generate or transmit the transmission tone 202 using a speaker, a transmitter, or a combination thereof integrated in or connected to the one or more devices. Also for example, the one or more devices receive or detect the transmission tone 202 using a microphone, a receiver, or a combination thereof.

The one or more devices in the computing system 100 can generate instances of the transmission tone 202 corresponding to the specific device. For example, the first device 102 can generate a first tone 204, the third device 108 can generate a third tone 206, the fourth device 110 can generate the fourth tone 208, or a combination thereof. The first tone 204, the third tone 208, the fourth tone 208, or a combination thereof can each include the transmission frequency, the transmission bandwidth, other embedded information, or a combination thereof unique to the transmitting device and different from each other.

The one or more devices in the computing system 100 can generate or communicate the transmission tone 202 having a transmission characteristic 210. The transmission characteristic 210 can be a description of one or more physical characteristics of the transmission tone 202. The transmission characteristic 210 can include the transmission frequency, the transmission bandwidth, a shape or type of the wave, amplitude or power, or a combination thereof. As a specific example, the transmission characteristic 210 can include a specific amplitude level for the transmission tone 202, the transmission frequency in an inaudible ultrasonic range between 18-20 kilohertz, or a combination thereof.

The transmission characteristic 210 can be unique for the transmitting device. For example, the first tone 204 can be generated with a first characteristic 212, the third tone 206 with a third characteristic 214, the fourth tone 208 with a fourth characteristic 216, or a combination thereof.

The computing system 100 can determine unique tones for a set of devices within a geographic area. The computing system 100 can further use the unique tones to identify the devices, identify a relative location of the devices, or a combination thereof. Detailed description of the identification processes will be described below.

The computing system 100 can further use the transmission tone 202 to identify and process a command movement 218. The command movement 218 can be an action or a sequence of locations regarding the user's person reserved for operating one or more devices in the computing system 100. For example, the command movement 218 can include waving or moving user's hand, arm, or body relative to the device.

The computing system 100 can determine a command-movement direction 220. The command-movement direction 220 is a description of spatial movement for the command movement 218 of the user. The command-movement direction 220 can identify a starting region and an ending region, a sequence of locations over time, or a combination thereof or describe the direction relative to the devices in the computing system 100.

For example, the command-movement direction 220 can describe the command movement 218 as being from "right to left", "forward", or a combination thereof relative to the user, a reference point, a device, or a combination thereof. Also for example, the command-movement direction 220 can describe the command movement 218 as going toward a device, from one device to another device, or a combination thereof.

The computing system 100 can include a gesture command 222. The gesture command 222 is an instruction associated with a movement related to the user for operating the computing system 100 or a device therein. The gesture command 222 can correspond to the command movement 220, the command-movement direction 220, or a combination thereof. For example, the gesture command 222 can be a process, an instruction, a function, an action, or a combination thereof initiated by the command movement 220.

The computing system 100 can identify a tone-detection result 224. The tone-detection result 224 is information received or identified for communication between devices using a transmission frequency, a transmission bandwidth, or a combination thereof. The tone-detection result 224 can include reception or identification of a wave, such as for wireless signals or sounds. The transmission tone 202 can correspond to the transmission tone 202.

The devices in the computing system 100 can individually identify the tone-detection result 224. For example, the first device 102 can identify a first-detection result 226, the third device 108 can identify a third-detection result 228, the fourth device 110 can identify a fourth-detection result 230, or a combination thereof.

The tone-detection result 224 can include traits or characteristics related to one or more instance of the transmission tone 202. For example, the first-detection result 226, the third-detection result 228, the fourth-detection result 230, or a combination thereof can include identified traits or characteristics corresponding to the first tone 204, the third tone 206, the fourth tone 208, or a combination thereof. As a more specific example, the first-detection result 226, the third-detection result 228, the fourth-detection result 230, or a combination thereof can identify information corresponding to the first characteristic 212, the third characteristic 214, the fourth characteristic 216, or a combination thereof.

The computing system 100 can determine a wave-detection profile 232 based on the tone-detection result 224. The wave-detection profile 232 is analyzed characteristics of the tone-detection result 224. The wave-detection profile 232 can determine or estimate the transmission characteristic 210 of the originally transmitted instance of the transmission tone 202.

The wave-detection profile 232 can be specific to each of the devices in the computing system 100 and include analyzed results associated with the transmission characteristic 210. For example, a first-detection profile 234 can be the analyzed results corresponding to the first-detection result 226, a third-detection profile 236 can be the analyzed results corresponding to the third-detection result 228, or a fourth-detection profile 238 can be the analyzed results corresponding to the fourth-detection result 230. The wave-detection profile 232 can include the first-detection profile 234, the third-detection profile 236, the fourth-detection profile 238, or a combination thereof.

The wave-detection profile 232 can further include variety of information. For example, the wave-detection profile 232 can include a frequency shift 240, a shift direction 242 for the frequency shift 240, an amplitude change 244, or a combination thereof.

The frequency shift 240 is a change in the transmission frequency or the transmission bandwidth. The frequency shift 240 can occur when the signal traverses from the transmitting device to the receiving device. The frequency shift 240 can be a difference between the transmission characteristic 210 and the tone-detection result 224.

The frequency shift 240 can be caused by movement of objects or people. For example, the frequency shift 240 can be a Doppler shift for one or more tones resulting from movement of the transmitting device, the receiving device, the user, an object or a person, or a combination thereof. The frequency shift 240 can include an intensity value for describing a bandwidth or a change in frequency, a power or an energy level associated with a frequency or a time, or a combination thereof.

The shift direction 242 is an indication of increase or decrease in the frequency shift 240. For example, the frequency shift 240 can be an increase in frequency due to an object moving toward the transmitting device or the receiving device, or due to the transmitting device moving toward the receiving device. Also for example, the frequency shift 240 can be a decrease in frequency due to an object moving away from the transmitting device or the receiving device, or due to the transmitting device moving away from the receiving device.

The amplitude change 244 can be a difference in the transmitted amplitude and the received amplitude of the transmission tone 202. The amplitude change 244 can represent a loss in energy in the transmission tone 202 that occurs during the transmission.

It has been discovered that the transmission tone 202, the frequency shift 240 detected for representing the command movement 218, and the gesture command 222 associated thereto can provide increased functionality and simpler user interface for sharing or transfer data between devices in MDE situation. The transmission tone 202 can provide a method for identifying or determining the command movement 218 of the user through the corresponding frequency shift 240. The multiple unique instances of the transmission tone 202 can further be used to process direction or location of the user's movement relative to one or more devices in MDE. The relational direction or location can allow for a simple movement of a user's hand or arm to select a device or a set of devices in MDE, initiate the gesture command 222 to transfer or share data between devices, or a combination thereof.

Figure 3:
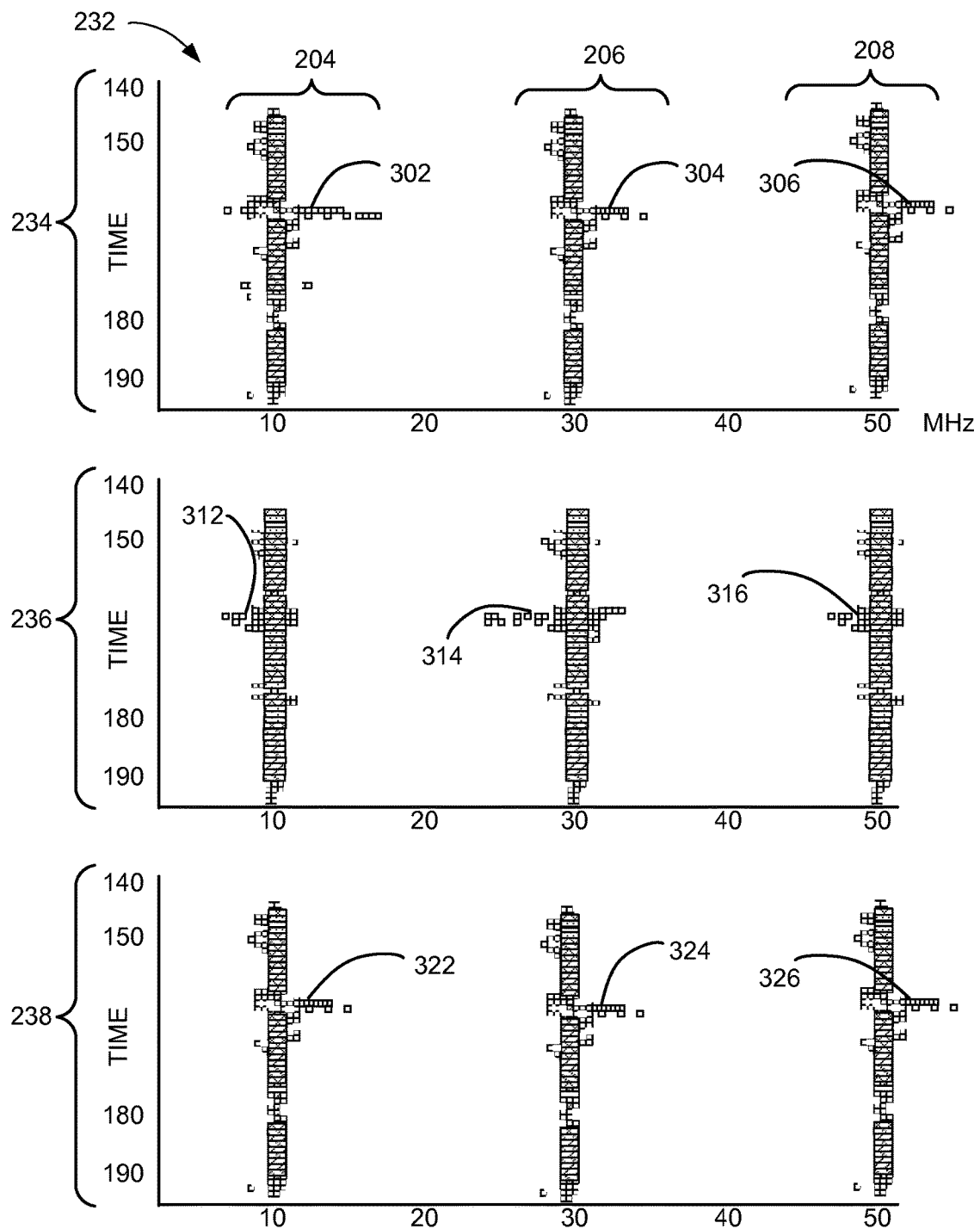
FIG. 3 is an example illustration of the wave-detection profile.

Referring now to FIG. 3, therein is shown an example illustration of the wave-detection profile 232. The wave-detection profile 232 can include the first-detection profile 234, the third-detection profile 236, the fourth-detection profile 238, or a combination thereof.

The wave-detection profile 232 can include instances of the frequency shift 240 of FIG. 2 detected by one or more device for each instance of the transmission tone 202 of FIG. 2. For example, the first-detection profile 226 can include a first-detection first-shift 302, a first-detection third-shift 304, a first-detection fourth-shift 306, for a combination thereof. The first-detection first-shift 302 can be the frequency shift 240 in the first tone 204, the first-detection third-shift 304 can be the frequency shift 240 in the third tone 206, and the first-detection fourth-shift 306 can be the frequency shift 240 in the fourth tone 208, each detected by the first device 102 of FIG. 1.

Also for example, the third-detection profile 236 can include a third-detection first-shift 312 for representing the frequency shift 240 in the first tone 204, a third-detection third-shift 304 for representing the frequency shift 240 in the third tone 206, a third-detection fourth-shift 316 for representing the frequency shift 240 in the fourth tone 208, or a combination thereof, each detected by the third device 108 of FIG. 1. For further example, the fourth-detection profile 238 can similarly include a fourth-detection first-shift 322, a fourth-detection third-shift 324, a fourth-detection fourth-shift 326, or a combination thereof corresponding to instances of the transmission tone 202, each detected by the fourth device 110 of FIG. 1.

The wave-detection profile 232 can show the frequency shift 240 corresponding to the command movement 218 of FIG. 2. For example, the command movement 218 can include moving the user's hand from right of the first device 102 toward the first device 102 and away from the third device 108, with the third device 108 located toward the right of the first device 102 and the fourth device 110 located toward the left of the first device 102 as shown in FIG. 2.

Continuing with the example, the wave-detection profile 232 can include the first-detection first-shift 302, the first-detection third-shift 304, the first-detection fourth-shift 306, the fourth-detection first-shift 322, the fourth-detection third-shift 324, the fourth-detection fourth-shift 326, or a combination thereof having an increase in the frequency for the shift direction 242 of FIG. 2 at the same time. The wave-detection profile 232 can also include the third-detection first-shift 312, the third-detection third-shift 304, the third-detection fourth-shift 316, or other instances of the frequency shift 240 having a decrease in the frequency for the shift direction 242 at the same time.

Continuing with the example, the wave-detection profile 232 can include the first-detection first-shift 302 can have higher intensity or magnitude, wider bandwidth, or a combination thereof compared to other instances of the of the frequency shift 240. The higher magnitude, wider bandwidth, or a combination thereof for the first-detection first-shift 302 can be based on having shortest distance between the user's hand and the transmitting device and the receiving device, largest signal strength, or a combination thereof.

Also for example, the command movement 218 can include moving the user's hand from below the first device 102 and toward the first device 102 when the devices are arranged as shown in FIG. 2. The wave-detection profile 232 can show the frequency shift 240 having a simultaneous increase in the frequency for the shift direction 242 for the first tone 204, the third tone 206, the fourth tone 208, or a combination thereof, as detected by the first device 102, the third device 108, the fourth device 110, or a combination thereof. The wave-detection profile 232 can show the first-detection first-shift 302 having the highest magnitude, widest bandwidth, or a combination thereof in comparison to other instances of the frequency shift 240.

The wave-detection profile 232 can be represented as a set of frequencies detected or identified by a device at specific time. The wave-detection profile 232 can be a frequency domain response, such as a result of Fast Fourier Transform (FFT) or Digital Fourier Transform (DFT), of the tone-detection result 224.

The increase in the frequency can be represented by a spike in a right direction in frequency domain representation of the transmission tone 202, and the decrease in the frequency can be represented by a spike in a left direction. The increase in the frequency can correspond to the transmitting device moving toward the receiving device, an object or a person moving against a direction of transmission or moving toward a receiving device, or a combination thereof. The decrease in the frequency can correspond to the transmitting device moving away from the receiving device, an object or a person moving along a direction of transmission or moving away from a receiving device, or a combination thereof.

The wave-detection profile 232 can further include an intensity or a signal strength associated with the transmission tone 202. The intensity or the signal strength can be based on an amplitude, an energy, or a combination thereof associated with the transmission characteristic 210 of FIG. 2 or the tone-detection result 224 of FIG. 2. The intensity or the signal strength can be represented in a 3-dimentional graph (not shown), using a color scheme, (not shown), using a shading scheme, or a combination thereof.

Figure 4:
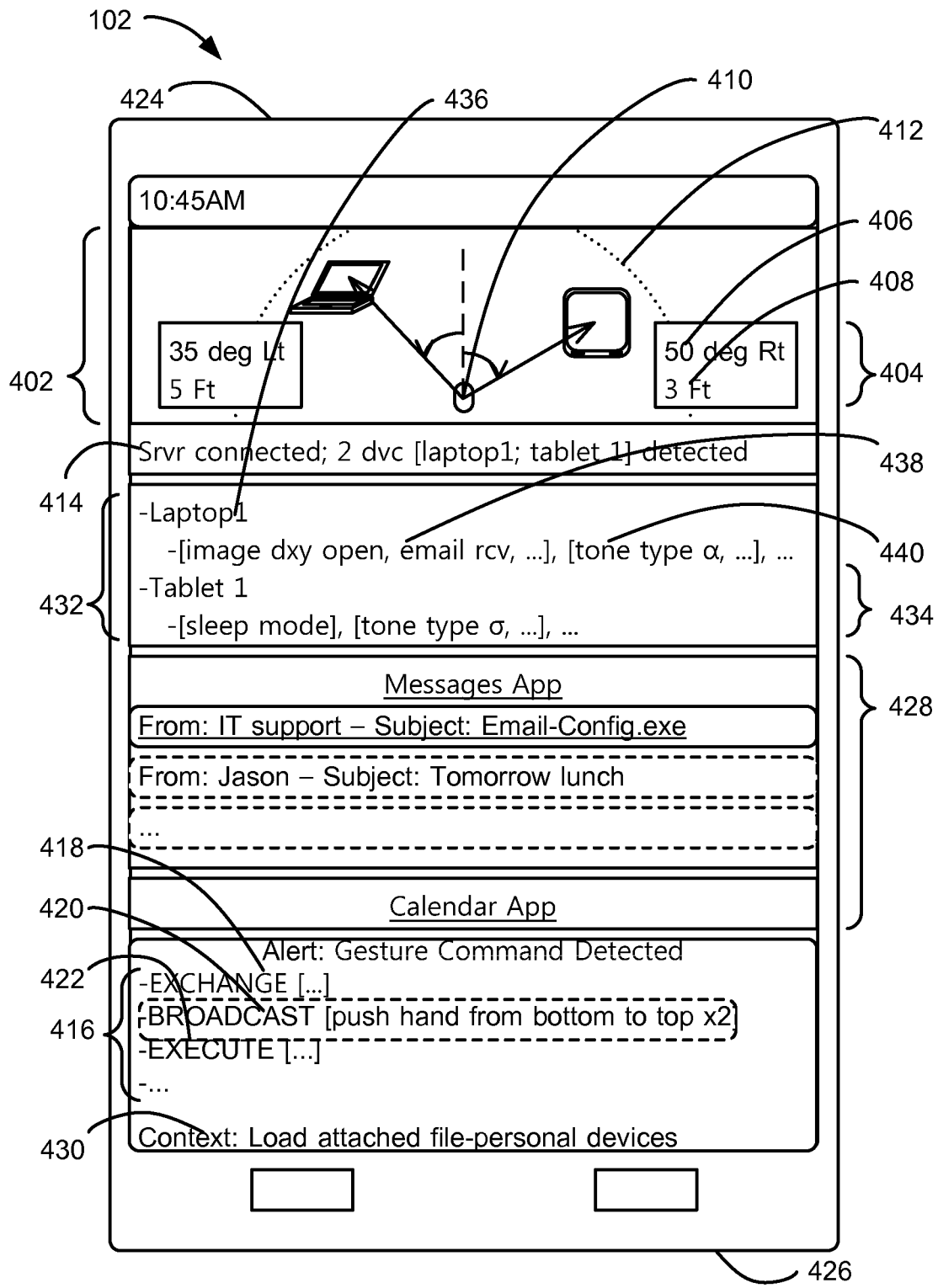
FIG. 4 is an example display of the first device.

Referring now to FIG. 4, therein is shown an exemplary block diagram of the computing system 100. The computing system 100 can include a relative-location profile 402 displayed on the first device 102 as an example. The relative-location profile 402 is a description of geographical locations of the devices in the computing system 100. The relative-location profile 402 can be a description of one or more locations using a coordinate system or a location relative to a reference location.

For example, the relative-location profile 402 can include a location data 404. The location data 404 is geographical location information for the devices in the computing system 100, such as global positioning system (GPS) coordinates or distance and angle relative to a reference location for the first device 102 of FIG. 1, the third device 108 of FIG. 1, the fourth device 110 of FIG. 1, or a combination thereof.

The relative-location profile 402 can further include a reference device 410, a connection area 412, a device-set count 414, or a combination thereof. The location data 404 can be based on the reference device 410, the connection area 412, or a combination thereof.

The reference device 410 is a designation for the device associated with the user. The reference device 410 can be the device currently interfacing with the user, closest to the user, on the person of the user, most closely associated with the user among the devices based on history or type of device, or a combination thereof. The reference device 410 can be the basis or a reference point for describing the locations of other devices.

For example, the reference device 410 can be the first device 102, the third device 108, or the fourth device 110 being used by the user or on the person of the user. The computing system 100 can describe the physical location of the first device 102, the third device 108, the fourth device 110, the second device 106 of FIG. 1, or a combination thereof based on the reference device 410.

For illustrative purposes, the reference device 410 will be described as the first device 102 interfacing directly with the user. However, it is understood that the reference device 410 can be any other device in the computing system 100, such as the third device 108 or the fourth device 110.

The connection area 412 is a geographic area surrounding the reference device 410 for locating the devices and interacting with the devices. The connection area 412 can be represented as a set of boundaries, a distance from the reference device 410, or a combination thereof.

For example, the connection area 412 can be an area within a room, a conference hall, a building, or a combination thereof within boundaries as described by a schematic, a design, a property description, or a combination thereof. Also for example, the connection area 412 can be a circular area having the reference device 410 in the center and a radius determined by a capability of a device or a signal strength of the transmission tone 202 of FIG. 2, or a combination thereof.

The device-set count 414 is a number of devices within the connection area 412. The device-set count 414 can be relative to the reference device 410. The device-set count 414 can be used for processing the wave-detection profile 232 of FIG. 2. The device-set count 414 can include a server, such as the second device 106 of FIG. 1 or a service provider. Any device capable of detecting or identifying a communication from the transmitting device can be determined as being in the connection area 412 and contribute to the device-set count 414.

The device-set count 414 can further be associated with the relative-location profile 402. For example, the device-set count 414 can describe or represent an accuracy, a complexity, a dimensional representation, or a combination thereof for the location data 404.

The location data 404 can include a direction estimate 406, a distance estimate 408, or a combination thereof for locating devices relative to the reference device 410. The direction estimate 406 can be an estimate of an angle, a regional implication, or a combination thereof relative to an orientation of the reference device 410. For example, the direction estimate 406 can be one or more angular measurements based on one or more axes of the reference device 410. Also for example, the direction estimate 406 can be right or left, forward or backward, or a combination thereof from the reference point of the user based on the interfacing portion of the reference device 410.

The distance estimate 408 can be an estimate of distance between the reference device 410 and other devices. The distance estimate 408 can be based on processing the coordinate data, strength of the transmission tone 202, or a combination thereof.

The computing system 100 can include a gesture profile 416. The gesture profile 416 is a set of values or thresholds defining a correlation between a movement of the user with a response or a task for the computing system 100. The gesture profile 416 can correlate various values or thresholds to various different responses or tasks.

The gesture profile 416 can include characteristics or patterns of physical movement for the command movement 218 of FIG. 2. The gesture profile 416 can include a user's position, a coordinate or a location of the user's hand or arm, a timing associated thereof, a sequence thereof, a threshold associated thereto, or a combination thereof.

The gesture profile 416 can further include values or thresholds for evaluating environmental or current information. For example, the gesture profile 416 can require a device to be in an "on" state, running a specific application, at a specific location, during a specified time window, or a combination thereof for performing a corresponding response or function.

The gesture profile 416 can include a variety of different movements corresponding to different commands. For example, the gesture profile 416 can include an exchange gesture 418, a broadcast gesture 420, an execution gesture 422, or a combination thereof.

The exchange gesture 418 can be a set of the command movement 218 for controlling sending and receiving of information between devices. For example, the exchange gesture 418 can send or receive images, files, data, or a combination thereof between devices. Also for example, the exchange gesture 418 can exchange a user interface or a pointer for continuing application of an application on a different device. As a more specific example, the exchange gesture 418 can be for transferring between the reference device 410 and another device or between devices not including the reference device 410.

The broadcast gesture 420 can be a set of the command movement 218 for sending information from one device to one or more devices in the computing system 100. For example, the broadcast gesture 420 can broadcast information, such as sending a message to or displaying an image on other devices, from the first device 102, the second device 106, the third device 108, or the fourth device 110 to one or more devices in the connection area 412, one or more devices meeting a requirement or a condition, or a combination thereof.

As a more specific example, the broadcast gesture 420 can correspond to the user's hand moving along a direction along a reference top portion 424 and a reference bottom portion 426 of the reference device 410. The user's hand can move toward the reference bottom portion 426, from the reference bottom portion 426 to the reference top portion 424, past the reference top portion 424, or a combination thereof along the direction. The broadcast gesture 420 can be a number of user's hand movements, a timing or a sequence thereof, or a combination thereof.

The reference bottom portion 426 and the reference top portion 424 can be based on interfacing with the user. The reference bottom portion 426 and the reference top portion 424 can correspond to a user-perceived top and bottom portion of a display screen on the reference device 410. The reference bottom portion 426 and the reference top portion 424 can based on the user's perspective and adjust based on a device-orientation.

For example, for a landscape orientation of the device screen, the reference bottom portion 426 and the reference top portion 424 can be side or longer edges of the reference device 410. Also for example, for a portrait orientation of the device screen, the reference bottom portion 426 and the reference top portion 424 can be shorter edges of the reference device 410.

The execution gesture 422 can be a set of the command movement 218 for initiating a function. For example, the execution gesture 422 can include starting or closing an application, saving data, performing a specific action, controlling a feature or a function of a device, or a combination thereof. As a more specific example, the execution gesture 422 can turn a device on or off, control the volume or brightness, execute a software or an application on a device, or a combination thereof.

The computing system 100 can further use a contextual factor 428, a corresponding instance of a gesture context 430, or a combination thereof to process the command movement 218. The contextual factor 428 is situational or environmental information associated with the command movement 218.

For example, the contextual factor 428 can include a device location, a current time, an activity name or type, a schedule detail, such as an attendee or a purpose, a software or an application list or a progress indicator, or a combination thereof at the moment of the command movement 218. Also for example, the contextual factor 428 can include communication information, such as email or text messages, including one or more keywords associated with the command movement 218.

The gesture context 430 is a representation or a categorization of a situation, an environment, a purpose, a significance, or a combination thereof associated with the command movement 218. The gesture context 430 can be represented using an identification, a categorical value, a set of parameters, a machine-learning cluster or model, or a combination thereof for representing the situation, the environment, the purpose, the significance, or a combination thereof. The gesture context 430 can be an abstraction of a value or a reason for the user regarding the command movement 218.

The gesture context 430 can be based on the contextual factor 428. Details regarding the gesture context 430, the contextual factor 428, and the associated processing for the command movement 218 will be discussed below.

The computing system 100 can further use device-detail information 432. The device-detail information 432 is a description of one or more data, status, state, process, or a combination thereof current for one or more devices of the computing system 100. The device-detail information 432 can list software or application, data associated with the software or the application, a pointer or a progress indicator associated with the software or the application running at the time of transmission.

The device-detail information 432 can further include identification of corresponding device for the process information, information for the transmission tone 202, or a combination thereof. The device-detail information 432 can further include current location for a transmitting device, results from calculating locations relative to the transmitting device, or a combination thereof.

The device-detail information 432 can be for the first device 102, the third device 108, the fourth device 110, or a combination thereof. The device-detail information 432 can be specific for the transmitting device. The computing system 100 can use the device-detail information 432 as the contextual factor 428.

The device-detail information 432 can be based on a detail information format 434. The detail information format 434 can include content, an arrangement, a design, an organization, or a combination thereof. The device-detail information 432 can be based on a specification, a standard, or a combination thereof. The device-detail information 432 can also be based on the computing system 100. The device-detail information 432 can include various information, such as a device identification 436, an execution profile 438, a tone detail 440, or a combination thereof according to the detail information format 434.

The device identification 436 can include device serial number, ownership information, contact information, device name, manufacturer identification, or a combination thereof. The execution profile 438 can include a list of software or application running on one or more device, data associated with the software or the application, a pointer or a progress indicator associated with the software or the application running at the time of transmission.

The tone detail 440 can include details regarding the transmission tone 202, such as a transmission time, a measurement of transmitted energy, a pattern for the transmission, a shape or a type of signal, a code associated with the signal, or a combination thereof. The tone detail 440 can be details for actual or intended transmission according to the transmitting device.

The device-detail information 432 can be included in the transmission tone 202. The device-detail information 432 can also be communicated separate from the transmission tone 202.

As an example of the process, the computing system 100 can detect, identify, determine, or a combination thereof to recognize the command movement 218 corresponding to the broadcast gesture 420. Based on the devices identified by the relative-location profile 402, the contextual factor 428, such as an email having attachment or a current location of the reference device 410, the device-detail information 432 from the near-by devices, or a combination thereof, the computing system 100 can further identify or determine the gesture context 430.

Continuing with the example, the computing system 100 can load or transfer data from the reference device 410 based on recognizing the broadcast gesture 420, determining the gesture context 430, or a combination thereof. As a more specific example, the computing system 100 can load an email configuration file on all personally owned devices, such as the third device 108 or the fourth device 110, based on attached files, email subject, the current location, the movement of the user's hand, or a combination thereof.

Figure 5:
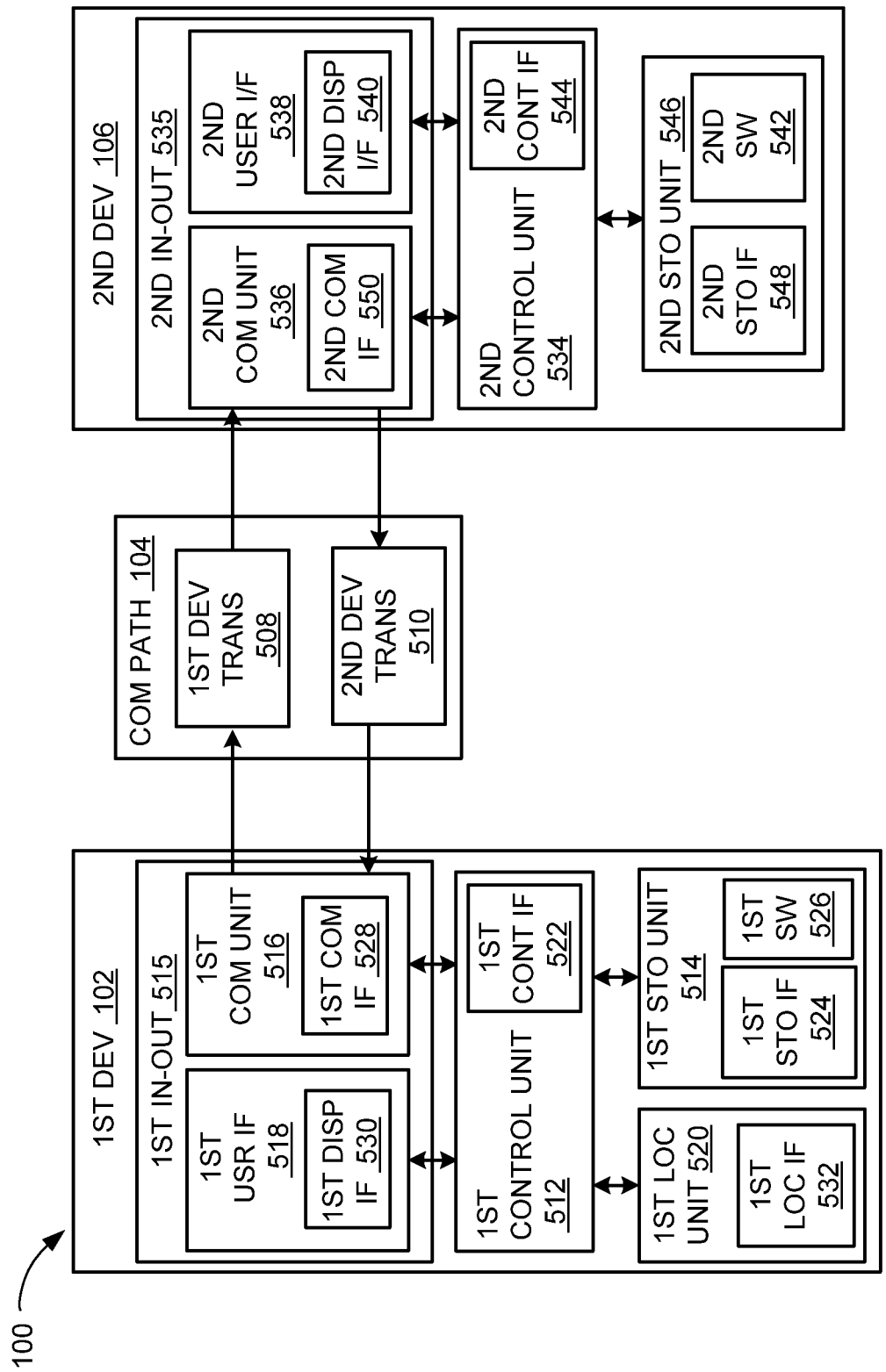
FIG. 5 is an example block diagram of the computing system.

Referring now to FIG. 5, therein is shown an exemplary block diagram of the computing system 100. The computing system 100 can include the first device 102, the network 104, and the second device 106. The first device 102 can send information in a first device transmission 508 over the network 104 to the second device 106. The second device 106 can send information in a second device transmission 510 over the network 104 to the first device 102.

For illustrative purposes, the computing system 100 is shown with the first device 102 as a client device, although it is understood that the computing system 100 can have the first device 102 as a different type of device. For example, the first device 102 can be a server having a display interface.

Also for illustrative purposes, the computing system 100 is shown with the second device 106 as a server, although it is understood that the computing system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 512, a first storage unit 514, a first input-output unit 515, including portions such as a first communication unit 516 and a first user interface 518, and a first location unit 520. The first control unit 512 can include a first control interface 522. The first control unit 512 can execute a first software 526 to provide the intelligence of the computing system 100.

The first control unit 512 can be implemented in a number of different manners. For example, the first control unit 512 can be a processor, an application specific integrated circuit (ASIC) an embedded processor, a microprocessor, a hardware control logic, a hardware finite state machine (FSM), a digital signal processor (DSP), or a combination thereof. The first control interface 522 can be used for communication between the first control unit 512 and other functional units in the first device 102. The first control interface 522 can also be used for communication that is external to the first device 102.

The first control interface 522 can receive information from the other functional units or from external sources, or can transmit information to the other functional units or to external destinations. The external sources and the external destinations refer to sources and destinations external to the first device 102.

The first control interface 522 can be implemented in different ways and can include different implementations depending on which functional units or external units are being interfaced with the first control interface 522. For example, the first control interface 522 can be implemented with a pressure sensor, an inertial sensor, a microelectromechanical system (MEMS), optical circuitry, waveguides, wireless circuitry, wireline circuitry, or a combination thereof.

The first storage unit 514 can store the first software 526. The first storage unit 514 can also store the relevant information, such as data representing incoming images, data representing previously presented image, sound files, or a combination thereof.

The first storage unit 514 can be a volatile memory, a nonvolatile memory, an internal memory, an external memory, or a combination thereof. For example, the first storage unit 514 can be a nonvolatile storage such as non-volatile random access memory (NVRAM), Flash memory, disk storage, or a volatile storage such as static random access memory (SRAM).

The first storage unit 514 can include a first storage interface 524. The first storage interface 524 can be used for communication between the first storage unit 514 and other functional units in the first device 102. The first storage interface 524 can also be used for communication that is external to the first device 102.

The first storage interface 524 can receive information from the other functional units or from external sources, or can transmit information to the other functional units or to external destinations. The external sources and the external destinations refer to sources and destinations external to the first device 102.

The first storage interface 524 can include different implementations depending on which functional units or external units are being interfaced with the first storage unit 514. The first storage interface 524 can be implemented with technologies and techniques similar to the implementation of the first control interface 522.

The first input-output unit 515 can enable communication of information to and from the first device 102. The first input-output unit 515 can communicate information with the user, another device, or a combination thereof. The first input-output unit 515 can communicate the information using the first user interface 518, the first communication unit 516, or a combination thereof.

The first communication unit 516 can enable external communication to and from the first device 102. For example, the first communication unit 516 can permit the first device 102 to communicate with the second device 106, a different device, an attachment, such as a peripheral device or a desktop computer, the network 104, or a combination thereof.

The first communication unit 516 can also function as a communication hub allowing the first device 102 to function as part of the network 104 and not limited to be an end point or terminal unit to the network 104. The first communication unit 516 can include active and passive components, such as microelectronics or an antenna, for interaction with the network 104.

The first communication unit 516 can include a baseband device or component, a modem, a digital signal processor, or a combination thereof for transmitting, formatting, receiving, detecting, decoding, further processing, or a combination thereof for communication signals. The first communication unit 516 can include one or more portions for processing the voltages, the currents, the digital information, or a combination thereof, such as an analog-to-digital converter, a digital-to-analog converter, a filter, an amplifier, a processor-type circuitry, or a combination thereof. The first communication unit 516 can further include one or more portions for storing information, such as cache or RAM memory, registers, or a combination thereof.

The first communication unit 516 can include a first communication interface 528. The first communication interface 528 can be used for communication between the first communication unit 516 and other functional units in the first device 102. The first communication interface 528 can receive information from the other functional units or can transmit information to the other functional units.

The first communication interface 528 can include different implementations depending on which functional units are being interfaced with the first communication unit 516. The first communication interface 528 can be implemented with technologies and techniques similar to the implementation of the first control interface 522.

The first user interface 518 allows a user (not shown) to interface and interact with the first device 102. The first user interface 518 can include an input device and an output device. Examples of the input device of the first user interface 518 can include a keypad, a touchpad, soft-keys, a keyboard, a microphone, an infrared sensor for receiving remote signals, or any combination thereof to provide data and communication inputs.

The first user interface 518 can include a first display interface 530. The first display interface 530 can include an output device. The first display interface 530 can include a display, a projector, a video screen, a speaker, or any combination thereof.

The first control unit 512 can operate the first user interface 518 to display information generated by the computing system 100. The first control unit 512 can also execute the first software 526 for the other functions of the computing system 100, including receiving location information from the first location unit 520. The first control unit 512 can further execute the first software 526 for interaction with the network 104 via the first communication unit 516.

The first location unit 520 can generate location information, current heading, current acceleration, and current speed of the first device 102, as examples. The first location unit 520 can be implemented in many ways. For example, the first location unit 520 can function as at least a part of the global positioning system, an inertial computing system, a cellular-tower location system, a pressure location system, or any combination thereof. Also, for example, the first location unit 520 can utilize components such as an accelerometer or GPS receiver.

The first location unit 520 can include a first location interface 532. The first location interface 532 can be used for communication between the first location unit 520 and other functional units in the first device 102. The first location interface 532 can also be used for communication external to the first device 102.

The first location interface 532 can receive information from the other functional units or from external sources, or can transmit information to the other functional units or to external destinations. The external sources and the external destinations refer to sources and destinations external to the first device 102.

The first location interface 532 can include different implementations depending on which functional units or external units are being interfaced with the first location unit 520. The first location interface 532 can be implemented with technologies and techniques similar to the implementation of the first control unit 512.

The second device 106 can be optimized for implementing an embodiment of the present invention in a multiple device embodiment with the first device 102. The second device 106 can provide the additional or higher performance processing power compared to the first device 102. The second device 106 can include a second control unit 534, a second input-output unit 535, including portions such as a second communication unit 536 and a second user interface 538, and a second storage unit 546.

The second user interface 538 allows a user (not shown) to interface and interact with the second device 106. The second user interface 538 can include an input device and an output device. Examples of the input device of the second user interface 538 can include a keypad, a touchpad, softkeys, a keyboard, a microphone, or any combination thereof to provide data and communication inputs. Examples of the output device of the second user interface 538 can include a second display interface 540. The second display interface 540 can include a display, a projector, a video screen, a speaker, or any combination thereof.

The second control unit 534 can execute a second software 542 to provide the intelligence of the second device 106 of the computing system 100. The second software 542 can operate in conjunction with the first software 526. The second control unit 534 can provide additional performance compared to the first control unit 512.

The second control unit 534 can operate the second user interface 538 to display information. The second control unit 534 can also execute the second software 542 for the other functions of the computing system 100, including operating the second communication unit 536 to communicate with the first device 102 over the network 104.

The second control unit 534 can be implemented in a number of different manners. For example, the second control unit 534 can be a processor, an embedded processor, a microprocessor, hardware control logic, a hardware finite state machine (FSM), a digital signal processor (DSP), or a combination thereof.

The second control unit 534 can include a second control interface 544. The second control interface 544 can be used for communication between the second control unit 534 and other functional units in the second device 106. The second control interface 544 can also be used for communication that is external to the second device 106.

The second control interface 544 can receive information from the other functional units or from external sources, or can transmit information to the other functional units or to external destinations. The external sources and the external destinations refer to sources and destinations external to the second device 106.

The second control interface 544 can be implemented in different ways and can include different implementations depending on which functional units or external units are being interfaced with the second control interface 544. For example, the second control interface 544 can be implemented with a pressure sensor, an inertial sensor, a microelectromechanical system (MEMS), optical circuitry, waveguides, wireless circuitry, wireline circuitry, or a combination thereof.

A second storage unit 546 can store the second software 542. The second storage unit 546 can also store the information such as data representing incoming images, data representing previously presented image, sound files, or a combination thereof. The second storage unit 546 can be sized to provide the additional storage capacity to supplement the first storage unit 514.

For illustrative purposes, the second storage unit 546 is shown as a single element, although it is understood that the second storage unit 546 can be a distribution of storage elements. Also for illustrative purposes, the computing system 100 is shown with the second storage unit 546 as a single hierarchy storage system, although it is understood that the computing system 100 can have the second storage unit 546 in a different configuration. For example, the second storage unit 546 can be formed with different storage technologies forming a memory hierarchal system including different levels of caching, main memory, rotating media, or off-line storage.

The second storage unit 546 can be a volatile memory, a nonvolatile memory, an internal memory, an external memory, or a combination thereof. For example, the second storage unit 546 can be a nonvolatile storage such as non-volatile random access memory (NVRAM), Flash memory, disk storage, or a volatile storage such as static random access memory (SRAM).

The second storage unit 546 can include a second storage interface 548. The second storage interface 548 can be used for communication between the second storage unit 546 and other functional units in the second device 106. The second storage interface 548 can also be used for communication that is external to the second device 106.

The second storage interface 548 can receive information from the other functional units or from external sources, or can transmit information to the other functional units or to external destinations. The external sources and the external destinations refer to sources and destinations external to the second device 106.

The second storage interface 548 can include different implementations depending on which functional units or external units are being interfaced with the second storage unit 546. The second storage interface 548 can be implemented with technologies and techniques similar to the implementation of the second control interface 544.

The second input-output unit 535 can enable communication of information to and from the second device 106. The second input-output unit 535 can communicate information with the user, another device, or a combination thereof. The second input-output unit 535 can communicate the information using the second user interface 538, the second communication unit 536, or a combination thereof.

The second communication unit 536 can enable external communication to and from the second device 106. For example, the second communication unit 536 can permit the second device 106 to communicate with the first device 102 over the network 104.

The second communication unit 536 can also function as a communication hub allowing the second device 106 to function as part of the network 104 and not limited to be an end point or terminal unit to the network 104. The second communication unit 536 can include active and passive components, such as microelectronics or resistors, for interaction with the network 104.

The second communication unit 536 can include a baseband device or component, a modem, a digital signal processor, or a combination thereof for transmitting, formatting, receiving, detecting, decoding, further processing, or a combination thereof for communication signals. The second communication unit 536 can include one or more portions for processing the voltages, the currents, the digital information, or a combination thereof, such as an analog-to-digital converter, a digital-to-analog converter, a filter, an amplifier, a processor-type circuitry, or a combination thereof. The first communication unit 516 can further include one or more portions for storing information, such as cache or RAM memory, registers, or a combination thereof.

The second communication unit 536 can include a second communication interface 550. The second communication interface 550 can be used for communication between the second communication unit 536 and other functional units in the second device 106. The second communication interface 550 can receive information from the other functional units or can transmit information to the other functional units.

The second communication interface 550 can include different implementations depending on which functional units are being interfaced with the second communication unit 536. The second communication interface 550 can be implemented with technologies and techniques similar to the implementation of the second control interface 544.

The first communication unit 516 can couple with the network 104 to send information to the second device 106 in the first device transmission 508. The second device 106 can receive information in the second communication unit 536 from the first device transmission 508 of the network 104.

The second communication unit 536 can couple with the network 104 to send information to the first device 102 in the second device transmission 510. The first device 102 can receive information in the first communication unit 516 from the second device transmission 510 of the network 104. The computing system 100 can be executed by the first control unit 512, the second control unit 534, or a combination thereof. For illustrative purposes, the second device 106 is shown with the partition having the second user interface 538, the second storage unit 546, the second control unit 534, and the second communication unit 536, although it is understood that the second device 106 can have a different partition. For example, the second software 542 can be partitioned differently such that some or all of its function can be in the second control unit 534 and the second communication unit 536. Also, the second device 106 can include other functional units not shown in FIG. 5 for clarity.

The functional units in the first device 102 can work individually and independently of the other functional units. The first device 102 can work individually and independently from the second device 106 and the network 104.

The functional units in the second device 106 can work individually and independently of the other functional units. The second device 106 can work individually and independently from the first device 102 and the network 104.

The functional units described above can be implemented in hardware. For example, one or more of the functional units can be implemented using the a gate, circuitry, a processor, a computer, integrated circuit, integrated circuit cores, a pressure sensor, an inertial sensor, a microelectromechanical system (MEMS), a passive device, a physical non-transitory memory medium having instructions for performing the software function, a portion therein, or a combination thereof.

For illustrative purposes, the computing system 100 is described by operation of the first device 102 and the second device 106. It is understood that the first device 102 and the second device 106 can operate any of the modules and functions of the computing system 100.

Figure 6:
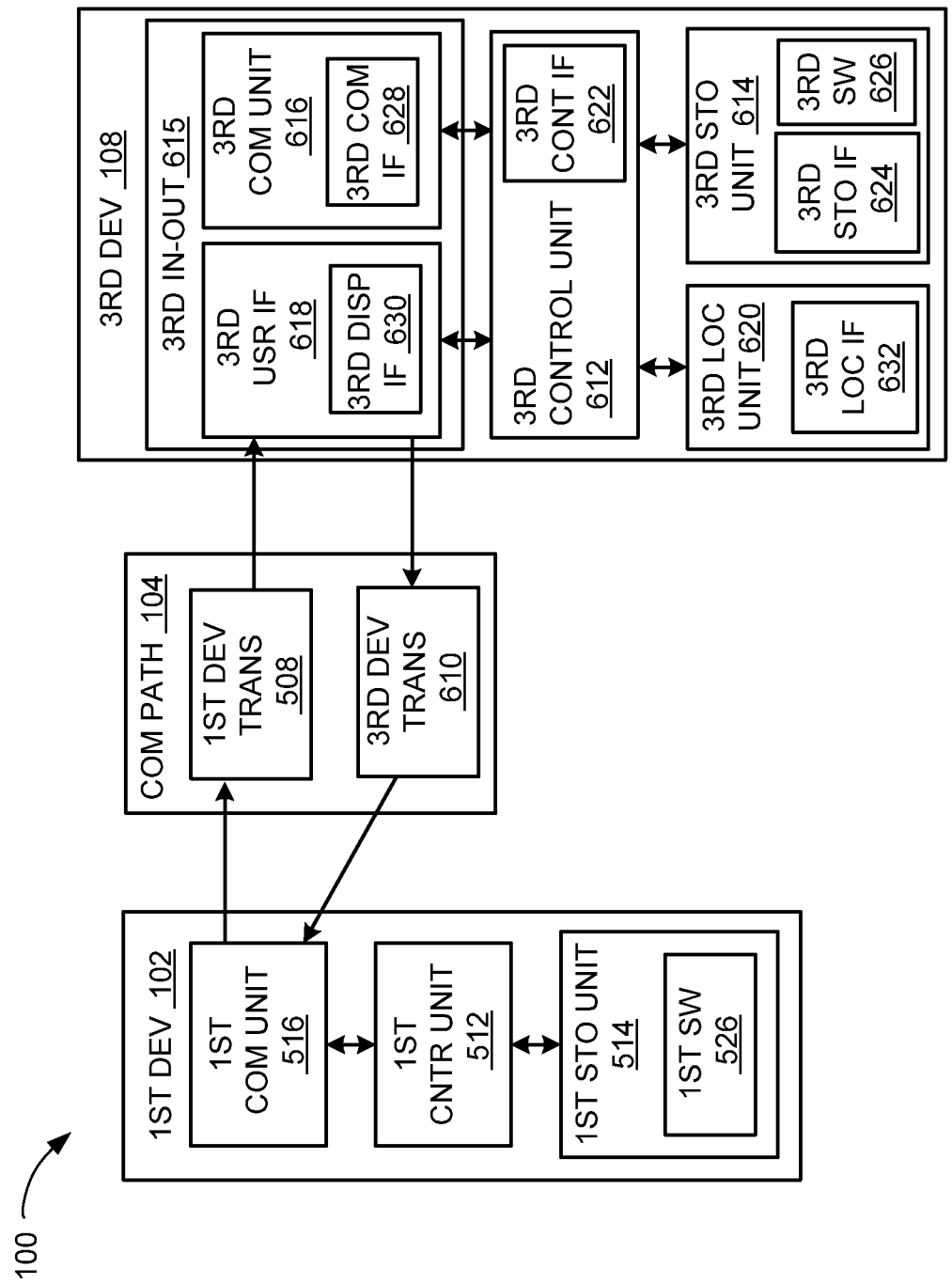
FIG. 6 is a further functional block diagram of the computing system.

Referring now to FIG. 6, therein is shown a further exemplary block diagram of the computing system 100. Along with the first device 102, and the second device 106 of FIG. 5, the computing system 100 can include the third device 108. The first device 102 can send information in the first device transmission 508 over the network 104 to the third device 108. The third device 108 can send information in a third device transmission 610 over the network 104 to the first device 102, the second device 106, or a combination thereof.

For illustrative purposes, the computing system 100 is shown with the third device 108 as a client device, although it is understood that the computing system 100 can have the third device 108 as a different type of device. For example, the third device 108 can be a server.

Also for illustrative purposes, the computing system 100 is shown with the first device 102 communicating with the third device 108. However, it is understood that the second device 106, the fourth device 110, or a combination thereof can also communicate with the third device 108 in a similar manner as the communication between the first device 102 and the second device 106.

For brevity of description in this embodiment of the present invention, the third device 108 will be described as a client device. The embodiment of the present invention is not limited to this selection for the type of devices. The selection is an example of an embodiment of the present invention.

The third device 108 can be optimized for implementing an embodiment of the present invention in a multiple device or multiple user embodiments with the first device 102. The third device 108 can provide the additional or specific functions compared to the first device 102, the second device 106, or a combination thereof. The third device 108 can further be a device owned or used by a separate user different from the user of the first device 102.

The third device 108 can include a third control unit 612, a third storage unit 614, a third input-output unit 515, including portions such as a third communication unit 616 and a third user interface 618, and a third location unit 620. The third control unit 612 can include a third control interface 622. The third control unit 612 can execute a third software 626 to provide the intelligence of the computing system 100.

The third control unit 612 can be implemented in a number of different manners. For example, the third control unit 612 can be a processor, an application specific integrated circuit (ASIC) an embedded processor, a microprocessor, a hardware control logic, a hardware finite state machine (FSM), a digital signal processor (DSP), or a combination thereof. The third control interface 622 can be used for communication between the third control unit 612 and other functional units in the third device 108. The third control interface 622 can also be used for communication that is external to the third device 108.

The third control interface 622 can receive information from the other functional units or from external sources, or can transmit information to the other functional units or to external destinations. The external sources and the external destinations refer to sources and destinations external to the third device 108.

The third control interface 622 can be implemented in different ways and can include different implementations depending on which functional units or external units are being interfaced with the third control interface 622. For example, the third control interface 622 can be implemented with a pressure sensor, an inertial sensor, a microelectromechanical system (MEMS), optical circuitry, waveguides, wireless circuitry, wireline circuitry, or a combination thereof.

The third storage unit 614 can store the third software 626. The third storage unit 614 can also store the relevant information, such as data representing incoming images, data representing previously presented image, sound files, or a combination thereof.

The third storage unit 614 can be a volatile memory, a nonvolatile memory, an internal memory, an external memory, or a combination thereof. For example, the third storage unit 614 can be a nonvolatile storage such as non-volatile random access memory (NVRAM), Flash memory, disk storage, or a volatile storage such as static random access memory (SRAM). Also for example, the third storage unit 614 can be distribution of storage elements, multiple hierarchy storage system including different levels of caching, main memory, rotating media, or off-line storage, or a combination thereof.

The third storage unit 614 can include a third storage interface 624. The third storage interface 624 can be used for communication between the third storage unit 614 and other functional units in the third device 108. The third storage interface 624 can also be used for communication that is external to the third device 108.

The third storage interface 624 can receive information from the other functional units or from external sources, or can transmit information to the other functional units or to external destinations. The external sources and the external destinations refer to sources and destinations external to the third device 108.

The third storage interface 624 can include different implementations depending on which functional units or external units are being interfaced with the third storage unit 614. The third storage interface 624 can be implemented with technologies and techniques similar to the implementation of the third control interface 622.

The third input-output unit 615 can enable communication of information to and from the third device 108. The third input-output unit 615 can communicate information with the user, another device, or a combination thereof. The third input-output unit 615 can communicate the information using the third user interface 618, the third communication unit 616, or a combination thereof.

The third communication unit 616 can enable external communication to and from the third device 108. For example, the third communication unit 616 can permit the third device 108 to communicate with the second device 106, the first device 102, the fourth device 110, a different device, an attachment, such as a peripheral device or a desktop computer, the network 104, or a combination thereof.

The third communication unit 616 can also function as a communication hub allowing the third device 108 to function as part of the network 104 and not limited to be an end point or terminal unit to the network 104. The third communication unit 616 can include active and passive components, such as microelectronics or an antenna, for interaction with the network 104.

The third communication unit 616 can include a baseband device or component, a modem, a digital signal processor, or a combination thereof for transmitting, formatting, receiving, detecting, decoding, further processing, or a combination thereof for communication signals. The third communication unit 616 can include one or more portions for processing the voltages, the currents, the digital information, or a combination thereof, such as an analog-to-digital converter, a digital-to-analog converter, a filter, an amplifier, a processor-type circuitry, or a combination thereof. The third communication unit 616 can further include one or more portions for storing information, such as cache or RAM memory, registers, or a combination thereof.

The third communication unit 616 can include a third communication interface 628. The third communication interface 628 can be used for communication between the third communication unit 616 and other functional units in the third device 108. The third communication interface 628 can receive information from the other functional units or can transmit information to the other functional units.

The third communication interface 628 can include different implementations depending on which functional units are being interfaced with the third communication unit 616. The third communication interface 628 can be implemented with technologies and techniques similar to the implementation of the third control interface 622.

The third user interface 618 allows a user (not shown) to interface and interact with the third device 108. The third user interface 618 can include an input device and an output device. Examples of the input device of the third user interface 618 can include a keypad, a touchpad, soft-keys, a keyboard, a microphone, an infrared sensor for receiving remote signals, or any combination thereof to provide data and communication inputs.

The third user interface 618 can include a third display interface 630. The third display interface 630 can include an output device. The third display interface 630 can include a display, a projector, a video screen, a speaker, or any combination thereof.

The third control unit 612 can operate the third user interface 618 to display information generated by the computing system 100. The third control unit 612 can also execute the third software 626 for the other functions of the computing system 100, including receiving location information from the third location unit 620. The third control unit 612 can further execute the third software 626 for interaction with the network 104 via the third communication unit 616.

The third location unit 620 can generate location information, current heading, current acceleration, and current speed of the third device 108, as examples. The third location unit 620 can be implemented in many ways. For example, the third location unit 620 can function as at least a part of the global positioning system, an inertial computing system, a cellular-tower location system, a pressure location system, or any combination thereof. Also, for example, the third location unit 620 can utilize components such as an accelerometer or GPS receiver.

The third location unit 620 can include a third location interface 632. The third location interface 632 can be used for communication between the third location unit 620 and other functional units in the third device 108. The third location interface 632 can also be used for communication external to the third device 108.

The third location interface 632 can receive information from the other functional units or from external sources, or can transmit information to the other functional units or to external destinations. The external sources and the external destinations refer to sources and destinations external to the third device 108.

The third location interface 632 can include different implementations depending on which functional units or external units are being interfaced with the third location unit 620. The third location interface 632 can be implemented with technologies and techniques similar to the implementation of the third control unit 612.

For illustrative purposes, the third device 108 is shown with the partition having the third user interface 618, the third storage unit 614, the third control unit 612, and the third communication unit 616, although it is understood that the third device 108 can have a different partition. For example, the third software 626 can be partitioned differently such that some or all of its function can be in the third control unit 612 and the third communication unit 616. Also, the third device 108 can include other functional units not shown in FIG. 6 for clarity.

The functional units in the third device 108 can work individually and independently of the other functional units. The third device 108 can work individually and independently from the first device 102, the second device 106, the fourth device 110, and the network 104.

For illustrative purposes, the computing system 100 is described by operation of the first device 102 and the third device 108. It is understood that the first device 102, the second device 106, the fourth device 110, and the third device 108 can operate any of the modules and functions of the computing system 100.

Figure 7:
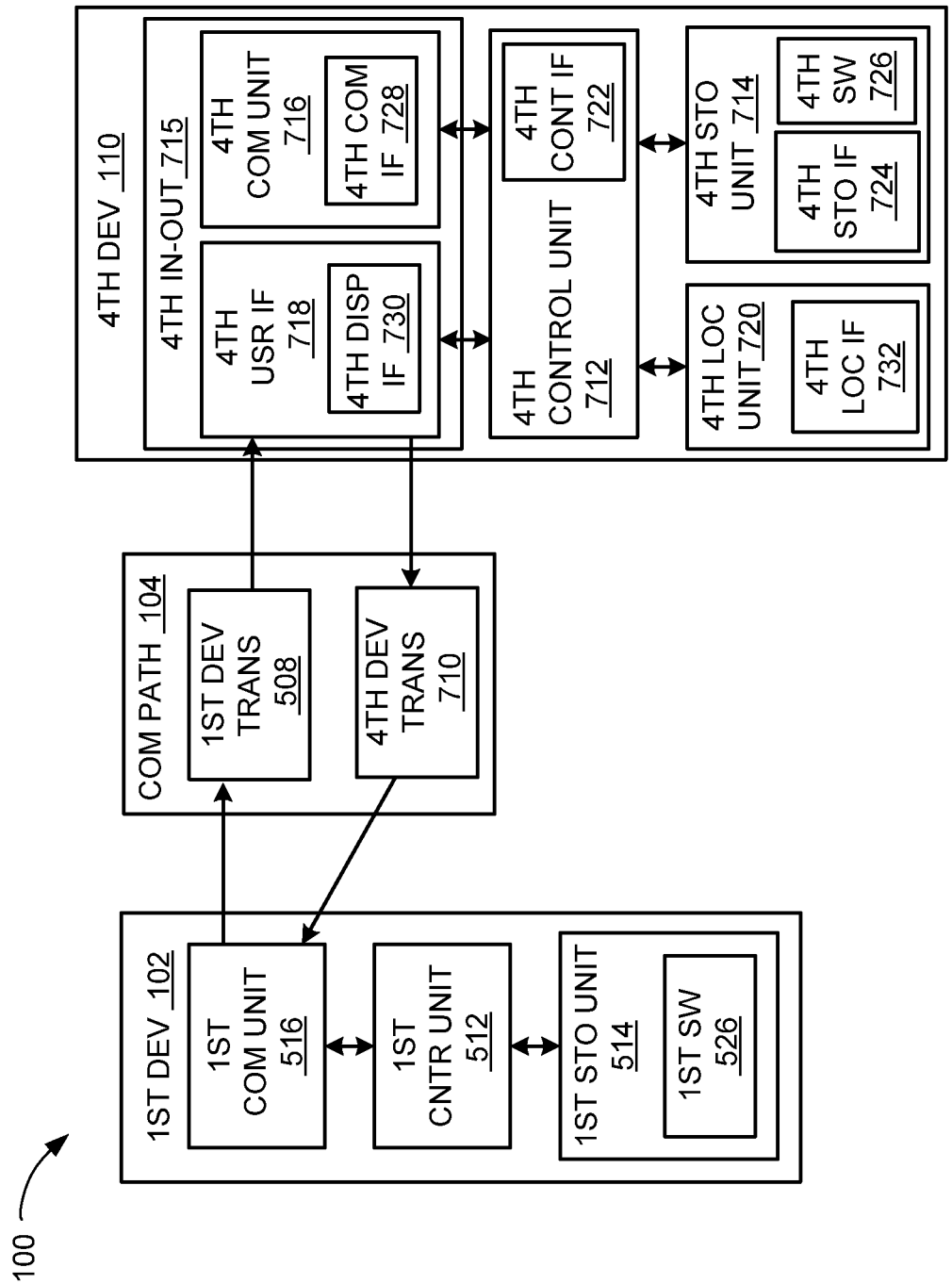
FIG. 7 is a further functional block diagram of the computing system.

Referring now to FIG. 7, therein is shown a further exemplary block diagram of the computing system 100. Along with the first device 102, the second device 106 of FIG. 5, or the third device 108 of FIG. 6, the computing system 100 can include the fourth device 110. The first device 102 can send information in the first device transmission 508 over the network 104 to the fourth device 110. The fourth device 110 can send information in a fourth device transmission 710 over the network 104 to the first device 102, the second device 106, the third device 108, or a combination thereof.

For illustrative purposes, the computing system 100 is shown with the fourth device 110 as a client device, although it is understood that the computing system 100 can have the fourth device 110 as a different type of device. For example, the fourth device 110 can be a server.

Also for illustrative purposes, the computing system 100 is shown with the first device 102 communicating with the fourth device 110. However, it is understood that the second device 106, the third device 108, or a combination thereof can also communicate with the fourth device 110 in a similar manner as the communication between the first device 102 and the second device 106.

For brevity of description in this embodiment of the present invention, the fourth device 110 will be described as a client device. The embodiment of the present invention is not limited to this selection for the type of devices. The selection is an example of an embodiment of the present invention.

The fourth device 110 can be optimized for implementing an embodiment of the present invention in a multiple device or multiple user embodiments with the first device 102. The fourth device 110 can provide the additional or specific functions compared to the first device 102, the second device 106, or a combination thereof. The fourth device 110 can further be a device owned or used by a common user or a separate user different from the user of the first device 102. The fourth device 110 can include a fourth control unit 734, a fourth communication unit 736, and a fourth user interface 738.

The fourth device 110 can include a fourth control unit 712, a fourth storage unit 714, a fourth input-output unit 715, including portions such as a fourth communication unit 716 and a fourth user interface 718, and a fourth location unit 720. The fourth control unit 712 can include a fourth control interface 722. The fourth control unit 712 can execute a fourth software 726 to provide the intelligence of the computing system 100.

The fourth control unit 712 can be implemented in a number of different manners. For example, the fourth control unit 712 can be a processor, an application specific integrated circuit (ASIC) an embedded processor, a microprocessor, a hardware control logic, a hardware finite state machine (FSM), a digital signal processor (DSP), or a combination thereof. The fourth control interface 722 can be used for communication between the fourth control unit 712 and other functional units in the fourth device 110. The fourth control interface 722 can also be used for communication that is external to the fourth device 110.

The fourth control interface 722 can receive information from the other functional units or from external sources, or can transmit information to the other functional units or to external destinations. The external sources and the external destinations refer to sources and destinations external to the fourth device 110.

The fourth control interface 722 can be implemented in different ways and can include different implementations depending on which functional units or external units are being interfaced with the fourth control interface 722. For example, the fourth control interface 722 can be implemented with a pressure sensor, an inertial sensor, a microelectromechanical system (MEMS), optical circuitry, waveguides, wireless circuitry, wireline circuitry, or a combination thereof.

The fourth storage unit 714 can store the fourth software 726. The fourth storage unit 714 can also store the relevant information, such as data representing incoming images, data representing previously presented image, sound files, or a combination thereof.

The fourth storage unit 714 can be a volatile memory, a nonvolatile memory, an internal memory, an external memory, or a combination thereof. For example, the fourth storage unit 714 can be a nonvolatile storage such as non-volatile random access memory (NVRAM), Flash memory, disk storage, or a volatile storage such as static random access memory (SRAM). Also for example, the fourth storage unit 714 can be distribution of storage elements, multiple hierarchy storage system including different levels of caching, main memory, rotating media, or off-line storage, or a combination thereof.

The fourth storage unit 714 can include a fourth storage interface 724. The fourth storage interface 724 can be used for communication between the fourth storage unit 714 and other functional units in the fourth device 110. The fourth storage interface 724 can also be used for communication that is external to the fourth device 110.

The fourth storage interface 724 can receive information from the other functional units or from external sources, or can transmit information to the other functional units or to external destinations. The external sources and the external destinations refer to sources and destinations external to the fourth device 110.

The fourth storage interface 724 can include different implementations depending on which functional units or external units are being interfaced with the fourth storage unit 714. The fourth storage interface 724 can be implemented with technologies and techniques similar to the implementation of the fourth control interface 722.

The fourth input-output unit 715 can enable communication of information to and from the fourth device 110. The fourth input-output unit 715 can communicate information with the user, another device, or a combination thereof. The fourth input-output unit 715 can communicate the information using the fourth user interface 718, the fourth communication unit 716, or a combination thereof.

The fourth communication unit 716 can enable external communication to and from the fourth device 110. For example, the fourth communication unit 716 can permit the fourth device 110 to communicate with the second device 106, the first device 102, the third device 108, a different device, an attachment, such as a peripheral device or a desktop computer, the network 104, or a combination thereof.

The fourth communication unit 716 can also function as a communication hub allowing the fourth device 110 to function as part of the network 104 and not limited to be an end point or terminal unit to the network 104. The fourth communication unit 716 can include active and passive components, such as microelectronics or an antenna, for interaction with the network 104.

The fourth communication unit 716 can include a baseband device or component, a modem, a digital signal processor, or a combination thereof for transmitting, formatting, receiving, detecting, decoding, further processing, or a combination thereof for communication signals. The fourth communication unit 716 can include one or more portions for processing the voltages, the currents, the digital information, or a combination thereof, such as an analog-to-digital converter, a digital-to-analog converter, a filter, an amplifier, a processor-type circuitry, or a combination thereof. The fourth communication unit 716 can further include one or more portions for storing information, such as cache or RAM memory, registers, or a combination thereof.

The fourth communication unit 716 can include a fourth communication interface 728. The fourth communication interface 728 can be used for communication between the fourth communication unit 716 and other functional units in the fourth device 110. The fourth communication interface 728 can receive information from the other functional units or can transmit information to the other functional units.

The fourth communication interface 728 can include different implementations depending on which functional units are being interfaced with the fourth communication unit 716. The fourth communication interface 728 can be implemented with technologies and techniques similar to the implementation of the fourth control interface 722.

The fourth user interface 718 allows a user (not shown) to interface and interact with the fourth device 110. The fourth user interface 718 can include an input device and an output device. Examples of the input device of the fourth user interface 718 can include a keypad, a touchpad, soft-keys, a keyboard, a microphone, an infrared sensor for receiving remote signals, or any combination thereof to provide data and communication inputs.

The fourth user interface 718 can include a fourth display interface 730. The fourth display interface 730 can include an output device. The fourth display interface 730 can include a display, a projector, a video screen, a speaker, or any combination thereof.

The fourth control unit 712 can operate the fourth user interface 718 to display information generated by the computing system 100. The fourth control unit 712 can also execute the fourth software 726 for the other functions of the computing system 100, including receiving location information from the fourth location unit 720. The fourth control unit 712 can further execute the fourth software 726 for interaction with the network 104 via the fourth communication unit 716.

The fourth location unit 720 can generate location information, current heading, current acceleration, and current speed of the fourth device 110, as examples. The fourth location unit 720 can be implemented in many ways. For example, the fourth location unit 720 can function as at least a part of the global positioning system, an inertial computing system, a cellular-tower location system, a pressure location system, or any combination thereof. Also, for example, the fourth location unit 720 can utilize components such as an accelerometer or GPS receiver.

The fourth location unit 720 can include a fourth location interface 732. The fourth location interface 732 can be used for communication between the fourth location unit 720 and other functional units in the fourth device 110. The fourth location interface 732 can also be used for communication external to the fourth device 110.

The fourth location interface 732 can receive information from the other functional units or from external sources, or can transmit information to the other functional units or to external destinations. The external sources and the external destinations refer to sources and destinations external to the fourth device 110.

The fourth location interface 732 can include different implementations depending on which functional units or external units are being interfaced with the fourth location unit 720. The fourth location interface 732 can be implemented with technologies and techniques similar to the implementation of the fourth control unit 712.

For illustrative purposes, the fourth device 110 is shown with the partition having the fourth user interface 718, the fourth storage unit 714, the fourth control unit 712, and the fourth communication unit 716, although it is understood that the fourth device 110 can have a different partition. For example, the fourth software 726 can be partitioned differently such that some or all of its function can be in the fourth control unit 712 and the fourth communication unit 716. Also, the fourth device 110 can include other functional units not shown in FIG. 7 for clarity.

The functional units in the fourth device 110 can work individually and independently of the other functional units. The fourth device 110 can work individually and independently from the first device 102, the second device 106, the third device 108, and the network 104.

For illustrative purposes, the computing system 100 is described by operation of the first device 102 and the fourth device 110. It is understood that the first device 102, the second device 106, the third device 108, and the fourth device 110 can operate any of the modules and functions of the computing system 100.

Figure 8:
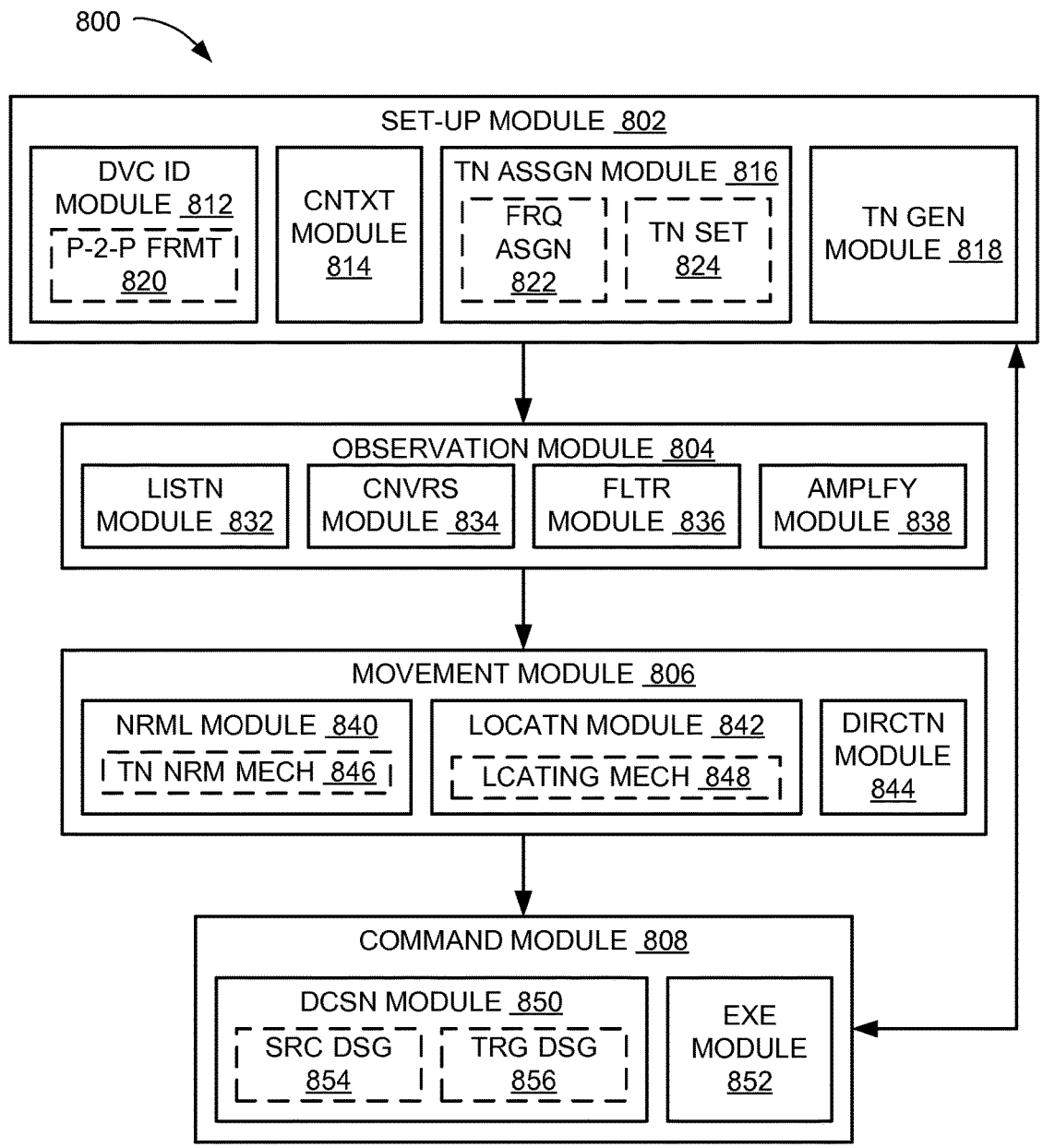
FIG. 8 is a control flow of the computing system.

Referring now to FIG. 8, therein is shown a control flow 800 of the computing system 100. The computing system 100 can include a set-up module 802, an observation module 804, a movement module 806, a command module 808, or a combination thereof. The set-up module 802 can be coupled to the observation module 804, and the observation module 804 can be coupled to the movement module 806. The movement module 806 can be coupled to the command module 808.

The modules can be coupled to each other in a variety of ways. For example, modules can be coupled by having the input of one module connected to the output of another, such as by using wired or wireless connections, the network 104 of FIG. 1, instructional steps, process sequence, or a combination thereof.

As a more specific example, one or more outputs of the set-up module 802 can be connected to one or more inputs of the observation module 804 using conductors or wireless communication devices. Also as a more specific example, one or more outputs of the observation module 804 can be connected to one or more inputs of the movement module 806, and one or more outputs of the movement module 806 can be connected to one or more inputs of the command module 808. As a further specific example, one or more outputs of the command module 808 can be coupled to one or more inputs of the observation module 804 or the movement module 806.

The computing system 100 can operate a device, such as by displaying images, recreating sounds, executing or exchanging process steps or instructions, or a combination thereof. The computing system 100 can operate the device by having the device perform designated instructions, sending designated instructions to the device, or a combination thereof.

The set-up module 802 is configured to set details for communicating the transmission tone 202 of FIG. 2. The set-up module 802 can set the details for communicating the transmission tone 202 between multiple devices. For example, the set-up module 802 can identify or update devices within the connection area 412 of FIG. 4 for communicating or linking with the reference device 410 of FIG. 4, determine the transmission characteristic 210 of FIG. 2 for each of the devices, or a combination thereof.

The set-up module 802 can include a device identification module 812, a context module 814, a tone assignment module 816, a tone generator module 818, or a combination thereof for setting details for communicating the transmission tone 202. The device identification module 812 is configured to identify or update devices within the connection area 412. The device identification module 812 can exchange information according to a format, protocol, sequence, frequency, or a combination thereof predetermined by the computing system 100, a standard, a method, or a combination thereof.

For example, the device identification module 812 can compare locations of various devices in the computing system 100. The device identification module 812 can select one of the devices as the reference device 410 and identify other devices within the connection area 412 corresponding to the reference device 410. The device identification module 812 can repeat the selection process with a different instance of the reference device 410 and compare location information of other devices to the corresponding instance of the connection area 412.

Also for example, the device identification module 812 can have a protocol, a method, a sequence of broadcasts or interactions, a frequency, or a combination thereof predetermined for devices within the computing system 100. The various devices can interact with each other based on the predetermined process. The various devices can identify or locate each other according to the predetermined process, based on ability to communicate, or a combination thereof.

The device identification module 812 can determine the device-detail information 432 of FIG. 4 or a portion therein, such as the device identification 436 of FIG. 4 or the detail information format 434 of FIG. 4. For example, the device identification module 812 can identify, arrange, store, or a combination thereof for the device-detail information 432 of the first device 102, the third device 108, the fourth device 110, or a combination thereof at a server, such as the second device 106 of FIG. 1. The device-detail information 432 can be arranged or stored according to the reference device 410, corresponding instances of the connection area 412, or a combination thereof.

Also for example, the device identification module 812 can share and store the device-detail information 432 between the first device 102, the third device 108, the fourth device 110, or a combination thereof according to a peer-to-peer format 820. The peer-to-peer format 820 is a category or a type of process involving multiple devices with decentralized or distributed network architecture.

The peer-to-peer format 820 can have each of the multiple devices, such as the first device 102, the third device 108, the fourth device 110, or a combination thereof acting as both suppliers and consumers of content or resources, instead of including the server, such as the second device 106, as the supplier and client devices as consumers. The peer-to-peer format 820 can include a protocol or an instruction set for determining a master or a controller among the multiple devices for managing the interaction. The peer-to-peer format 820 can directly exchange information between client devices, such as the first device 102, the third device 108, the fourth device 110, or a combination thereof, without the server.

The context module 814 is configured to determine the gesture context 430 of FIG. 4. The context module 814 can determine the gesture context 430 based on the contextual factor 428 of FIG. 4.

The context module 814 can include a predetermined set of one or more instances of the contextual factor 428 corresponding to one or more instances of the gesture context 430. For example, certain factor or combination of factors, such as receiving an email or making a phone call during a time scheduled for a meeting at work, can be associated or linked to an instance of the gesture context 430, such as using on a larger screen or convenient interface or transferring the data or function to a conference-ready phone.

The context module 814 can compare the contextual factor 428 identified by one or more of the devices in the computing system 100 to the predetermined set. For example, the tone context module 814 can compare the data received through the user interface unit, the communication unit, or a combination thereof for the first device 102, the second device 106, the third device 108, the fourth device 110, or a combination thereof to the predetermined set.

The context module 814 can determine the gesture context 430 associated with the command-movement direction 220 of FIG. 2. The context module 814 can further determine the gesture context 430 for determining and processing the command movement 218 of FIG. 2. The context module 814 can determine the gesture context 430 for generating the transmission tone 202 for identifying or determining the command movement 218 using the transmission tone 202.

The computing system 100 can calculate the command-movement direction 220 based on a response or a change in the transmission tone 202 from the command movement 218. The computing system 100 can use the command-movement direction 220 to identify or determine the command movement 218. Details regarding the usage of the gesture context 430 will be described below.

The tone assignment module 816 is configured to set communication details for devices within the connection area 412. The tone assignment module 816 can determine the transmission tone 202, the transmission characteristic 210 for the transmission tone 202, or a combination thereof for each of the devices.

The tone assignment module 816 can determine the transmission tone 202, the transmission characteristic 210 for the transmission tone 202, or a combination thereof for devices identified by the device identification module 812. The tone assignment module 816 can determine the transmission tone 202, the transmission characteristic 210, or a combination thereof based on the connection area 412 for one or more, or for each of the devices for the computing system 100.

For example, the tone assignment module 816 can determine the first tone 204 of FIG. 2 for the first device 102 of FIG. 1, the third tone 206 of FIG. 2 for the third device 108, the fourth tone 208 of FIG. 2 for the fourth device 110, or a combination with the first device 102 as the reference device 410. Continuing with the example, the tone assignment module 816 can determine the first tone 204, the third tone 206, the fourth tone 208, or a combination thereof for the first device 102, the third device 108, the fourth device 110, another device, or a combination thereof based on the reference device 410 as the third device 108 or the fourth device 110, based on the connection area 412 thereof, or a combination thereof.

Each instance of the transmission tone 202 can be unique for all devices within all instances of the connection area 412 for representing the devices in the computing system 100, such as for the first device 102, the third device 108, the fourth device 110, or a combination thereof. The instances of the transmission tone 202 can be based on communications, such as interactive sending and receiving messages between devices, within the connection area 412 based on a frequency assignment mechanism 822.

The frequency assignment mechanism 822 is a protocol, a method, a sequence for communications, a frequency, or a combination thereof predetermined for determining the transmission tone 202, the transmission characteristic 210 thereof, or a combination thereof. For example the frequency assignment mechanism can include a process, a protocol, a method, or a combination thereof for determining or assigning instances of the transmission tone 202 using a controller device, using a random selection, or a combination thereof.

As a more specific example, the frequency assignment mechanism 822 can include one or more steps or instructions for designating or recognizing the controller device within the connection area 412. The tone assignment module 816 can designate or recognize one of the devices within one instance of the connection area 412 as the controller device based on various factors.

Continuing with the example, the controlling device designation can be given based on personal ownership or access over shared access, based on a level of functionality or capability, based on status or time since interfacing with the user, or a combination thereof. The controlling device designation can be for a client device, such as the first device 102, the third device 108, or the fourth device 110, or for a server, such as the second device 106.

Also as a more specific example, the frequency assignment mechanism 822 can randomly arrange a timing for communicating, for selecting the transmission characteristic 210, or a combination thereof. The tone assignment module 816 can communicate an instance of the transmission characteristic 210 for one of the devices in the connection area 412. The tone assignment module 816 can determine the transmission characteristic 210 specific to the one of the devices when no communications through other devices are for the same instance of the transmission characteristic 210 simultaneously or within a threshold amount of time.

Continuing with the example, the tone assignment module 816 can communicate the same instance of the transmission characteristic 210 for the one of the devices after waiting a randomly selected duration. The tone assignment module 816 can also communicate a randomly selected instance of the transmission characteristic 210 for the one of the devices. The tone assignment module 816 can utilize the randomly selected duration or the randomly selected instance of the transmission characteristic 210 for the computing system 100 utilizing the peer-to-peer format 820.

The tone assignment module 816 can select from or use a tone set 824 for determining unique instances of the transmission characteristic 210. The tone set 824 is a set of characteristics or a method for selecting unique instances of the transmission characteristic 210 for each of the devices in the connection area 412. For example, the tone set 824 can include a list of possible frequencies, bandwidths, shapes or types, amplitude or power levels, or a combination thereof. Also for example, the tone set 824 can include an equation or a set of steps for generating a unique instance of the transmission frequency, the transmission bandwidth, the shape or type of the wave, the amplitude or power, or a combination thereof.

The frequency assignment mechanism 822 can utilize the peer-to-peer format 820, the server, or a combination thereof. The tone assignment module 816 can determine the transmission tone 202, the transmission characteristic 210 thereof, or a combination thereof directly between the devices, such as the first device 102, the third device 108, the fourth device 110, or a combination thereof, for the peer-to-peer format 820. The tone assignment module 816 can determine the transmission tone 202, the transmission characteristic 210 thereof, or a combination thereof without the peer-to-peer format 820, such as by using the server.

For example, the first device 102, the third device 108, the fourth device 110, or a combination thereof can determine the first characteristic 212 of FIG. 2, the third characteristic 214 of FIG. 2, the fourth characteristic 216 of FIG. 2, or a corresponding combination thereof based on direct communication between the devices according to the peer-to-peer format 820. Also for example, the second device 106 can determine and assign the first characteristic 212, the third characteristic 214, the fourth characteristic 216, or a combination thereof to the first device 102, the third device 108, the fourth device 110, or a corresponding combination thereof without the peer-to-peer format 820.

The set-up module 802 can perform the process for determining or assigning unique instances of the transmission tone 202 for each of the devices when the computing system 100, one or more of the devices therein, one or more of the functions, applications, or software therein, or a combination thereof is initialized, reset, or a combination thereof. For example, the set-up module 802 can perform the process by registering the first device 102, the third device 108, the fourth device 110, or a combination thereof at a server, such as the second device 106, when a device or a specific application in the device is initiated. Also for example, the set-up module 802 can perform the process by registering and assigning tones for the first device 102, the third device 108, the fourth device 110, or a combination thereof with each other using the peer-to-peer format 820.

The set-up module 802 can further perform the process based on the contextual factor 428 of FIG. 4, the gesture context 430 of FIG. 4, or a combination thereof. The set-up module 802 can perform the process when the contextual factor 428 matches a predetermined threshold or a predetermined pattern, such as based on prior history or as determined by the computing system 100, The set-up module 802 can be implemented in hardware, software, or a combination thereof. The set-up module 802 can use or be implemented in the first communication unit 516 of FIG. 5, the second communication unit 536 of FIG. 5, the third communication unit 616 of FIG. 6, the fourth communication unit 716 of FIG. 7, the first control unit 512 of FIG. 5, the second control unit 534 of FIG. 5, the third control unit 612 of FIG. 6, the fourth control unit 712 of FIG. 7, or a combination thereof to perform the processes, such as identify devices, determine unique instances of the transmission characteristic 210, or a combination thereof. The set-up module 802 can store any intermediate or any final results of the process, such as the transmission characteristic 210, the device identification 436, the device locations from the location unit of the device, or a combination thereof in the first storage unit 514 of FIG. 5, the second storage unit 546 of FIG. 5, the third storage unit 614 of FIG. 6, the fourth storage unit 714 of FIG. 7, or a combination thereof.

The tone generator module 818 is configured to generate the transmission tone 202. The tone generator module 818 can generate the transmission tone 202 using the first communication unit 516, the second communication unit 536, the third communication unit 616, the fourth communication unit 716, the first control unit 512, the second control unit 534, the third control unit 612, the fourth control unit 712, or a combination thereof.

The tone generator module 818 can generate the transmission tone 202 by varying a voltage, a current, or a combination thereof according to a pattern associated with the transmission characteristic 210. For example, the first device 102 can generate the first tone 204 using the pattern associated with the first characteristic 212, the third device 108 can generate the third tone 206 using the pattern associated with the third characteristic 214, the fourth device 110 can generate the fourth tone 208 using the pattern associated with the fourth characteristic 216, or a combination thereof as assigned by the tone assignment module 816.

The tone generator module 818 can generate the transmission tone 202 based on the contextual factor 428, the gesture context 430, or a combination thereof. The tone generator module 818 can generate the transmission tone 202 when the contextual factor 428 matches a specific instance of the gesture context 430, a specific instance of the contextual factor 428, or a combination thereof. The tone generator module 818 can have the client devices, such as the first device 102 or the fourth device 110, report the gesture context 430 or the contextual factor 428 to a server, and the server can have all devices in the connection area 412 each generate its own corresponding instance of the transmission tone 202.

The tone generator module 818 can also generate the transmission tone 202 according to the peer-to-peer format 820 and without the server. The tone generator module 818 can generate the transmission tone 202 based on the results of the context module 814. The tone generator module 818 can have the device having the contextual factor 428 matching the predetermined set generate its corresponding instance of the transmission tone 202. The other devices in the connection area 412 or any device capable of detecting the transmitted instance of the transmission tone 202 can also transmit its own instance of the transmission tone 202.

For example, the first device 102 can detect or identify the contextual factor 428 matching the predetermined set. The first device 102 can generate the first tone 204. The third device 108, the fourth device 110, or a combination thereof in the connection area 412 of the first device 102, able to detect or identify the first tone 204 as will be described below, or a combination thereof can transmit the corresponding instance of the transmission tone 202, such as the third tone 206, the fourth tone 208, or a combination thereof.

The tone generator module 818 can further generate the transmission tone 202 based on usage history. For example, the tone generator module 818 can identify one or a specific combination of the contextual factor 428, such as recurring time, place, application, participant, or a combination thereof, associated with previous generation of the transmission tone 202. The tone generator module 818 can identify the recurring factors as a new instance of the gesture context 430, as a trigger for generating the transmission tone 202, or a combination thereof in the predetermined set.

The tone generator module 818 can sustain the generation of the transmission tone 202 for a duration predetermined by the computing system 100. The tone generator module 818 can further sustain the transmission tone 202 based on continued detection of a triggering condition, such as the contextual factor 428, the gesture context 430, the transmission tone 202 initiated by another device, or a combination thereof.

It has been discovered that the transmission tone 202 generated based on the contextual factor 428 or the associated instance of the gesture context 430 provides increased usability and increased battery life for the computing system 100. The contextual factor 428 and the gesture context 430 can provide context-aware generation of the transmission tone 202, which can prepare the computing system 100 to identify the user's likely usage of the command movement 218 without burdening the user to configure the computing system 100. The contextual factor 428 and the gesture context 430 can further provide intelligent and selective generation of the transmission tone 202, which will eliminate unnecessary transmission of the transmission tone 202 to save power.

After determining unique instances of the transmission characteristic 210, generating the transmission tone 202, or a combination thereof, the control flow 800 can be passed to the observation module 804. The control flow 800 can pass through a variety of ways. For example, control flow 800 can pass by having processing results of one module passed to another module, such as by passing instances of the transmission characteristic 210 and the corresponding instances of the device identification 436 from the set-up module 802 to the observation module 804, by storing the processing results at a location known and accessible to the observation module 804, by notifying the observation module 804, such as by using a flag, an interrupt, a status signal, or a combination thereof, or a combination of processes thereof.

The observation module 804 is configured to determine the wave-detection profile 232 of FIG. 2. The observation module 804 can determine the wave-detection profile 232 including the frequency shift 240 of FIG. 2, the shift direction 242 of FIG. 2, the amplitude change 244 of FIG. 2, or a combination thereof.

The observation module 804 can determine the wave-detection profile 232 based on detection results utilizing one or more devices in the computing system 100, detection of one or more instances of the transmission tone 202, or a combination thereof. For example, the observation module 804 can determine the first-detection profile 226 of FIG. 2, the third-detection profile 236 of FIG. 2, the fourth-detection profile 238 of FIG. 2, or a combination thereof.

As a more specific example, the observation module 804 can determine the wave-detection profile 232 or a portion therein based on the tone-detection result 224. The observation module 804 can determine the wave-detection profile 232 or a portion therein based on the first-detection result 226 of FIG. 2 corresponding to the first device 102, the third-detection result 228 of FIG. 2 corresponding to the third device 108, the fourth-detection result 230 of FIG. 2 corresponding to the fourth device 110, or a combination thereof.

Also as a more specific example, the observation module 804 can determine the wave-detection profile 232 including one or more instances of the frequency shift 240, the amplitude change 244, or a combination thereof for various possibilities or combinations. The observation module 804 can determine the wave-detection profile 232 corresponding to instances of the transmission tone 202 or the first device 102, the third device 108, the fourth device 110, or a combination thereof generating or transmitting the corresponding instances of the transmission tone 202. The observation module can also determine the wave-detection profile 232 corresponding to the device identifying the transmission tone 202.

The observation module 804 can include a listening module 832, a conversion module 834, a filter module 836, an amplification module 838, or a combination thereof for determining the wave-detection profile 232. The listening module 832 is configured to identify the tone-detection result 224. The listening module 832 can identify the tone-detection result 224 for identifying the gesture command 222 of FIG. 2.

The listening module 832 can identify the tone-detection result 224 representing or corresponding to the transmission tone 202 transmitted by the first device 102, the third device 108, the fourth device 110, or a combination thereof. The listening module 832 can identify the tone-detection result 224 received at or identified by the first device 102, the third device 108, the fourth device 110, or a combination thereof.

The listening module 832 can identify the tone-detection result 224 using input-output units of one or more devices. For example, the listening module 832 can identify the tone-detection result 224 using the first user interface 518 of FIG. 5, the second user interface 538 of FIG. 5, the third user interface 618 of FIG. 6, the fourth user interface 718 of FIG. 7, the first communication unit 516, the second communication unit 536, the third communication unit 616, the fourth communication unit 716, or a combination thereof.

As a more specific example, the listening module 832 can identify the tone-detection result 224 using a microphone, an antenna, or a combination thereof in the first device 102, the second device 106, the third device 108, the fourth device 110, or a combination thereof to detect waves. The listening module 832 can identify the tone-detection result 224 by storing the tone-detection result 224 in the first device 102, the second device 106, the third device 108, the fourth device 110, or a combination thereof for further processing.

The listening module 832 can identify the tone-detection result 224 using the various devices in the computing system 100. For example, the listening module 832 can identify the first-detection result 226 through the first device 102, the third-detection result 228 through the third device 108, the fourth-detection result 230 through the fourth device 110, or a combination thereof.

The listening module 832 can be implemented with or without a server, such as the second device 106. For example, the various client devices can send the tone-detection result 224 to the second device 106 for storage and further processing. Also for example, the first device 102, the third device 108, the fourth device 110, or a combination thereof can store corresponding instances of the tone-detection result 224, share the tone-detection result 224 with one or more other device, share a processing result based on the tone-detection result 224 as described below, or a combination thereof without the server.

The conversion module 834 is configured to analyze one or more aspect of the tone-detection result 224. The conversion module 834 can analyze the tone-detection result 224 for different domains using a transformation method. For example, the conversion module 834 can use FFT or DFT to transform time-domain signals to frequency-domain signals, use inverse FFT or inverse DFT to transform frequency-domain signals to time-domain signals, or a combination thereof.

The conversion module 834 can transform portions of incoming real-time data and associate the transformation result to the received time. For example, the conversion module 834 can transform power or voltage fluctuation samples from the microphone or the antenna over a regular time interval and associate the result to a sequential or temporal order corresponding to the regular time interval. The conversion module 834 can use one or more instances of the user interface, the communication unit, the control unit, or a combination thereof for one or more of the devices to perform the analysis.

The filter module 836 is configured to clean or focus the tone-detection result 224 for further processing. The filter module 836 can clean or focus by removing unwanted portions, highlighting desired portions, or a combination thereof. For example, the filter module 836 can enhance the frequency shift 240 captured in the tone-detection result 224.

For example, the filter module 836 can remove unwanted portions using a low-pass filter, a high-pass filter, a band-pass filter, an adaptive filter, or a combination thereof associated with the transmission tone 202. The filter module 836 can include one or more instances of a digital or an analog filter tuned to pass frequencies corresponding to known, expected, or allowed instances of the transmission characteristic 210, such as included in the tone set 824. The filter module 836 can reject or suppress other frequencies as unwanted portions of the data.

Also for example, the filter module 836 can highlight desired portions using a match-filter or a different adaptive filter associated with the transmission tone 202. The filter module 836 can include one or more instances of a filter designed to increase patterns or frequencies matching the known, expected, or allowed instances of the transmission characteristic 210, such as included in the tone set 824.

For further example, the filter module 836 can highlight a variation or a change for expected instances of the transmission characteristic 210. The filter module 836 can highlight or identify, such as by using the match filter or a sequence of instructions, shift or changes in frequency associated with the frequency shift 240, the amplitude change 244, or a combination thereof.

The filter module 836 can use one or more instances of the user interface, the communication unit, the control unit, or a combination thereof for one or more of the devices to perform the filtering process. The filter module 836 can also be implemented as a dedicated filter implemented in the user interface, the communication unit, the control unit, or a combination thereof for one or more of the devices.

The amplification module 838 is configured to further highlight the desired portions of the tone-detection result 224. The amplification module 838 can use a signal amplification circuit implemented in hardware or an amplification factor implemented in firmware or software to process the processing results of the filter module 836. The amplification module 838 can enhance the frequency shift 240 captured in the tone-detection result 224.

The observation module 804 can use the tone-detection result 224 from the amplification module 838 to determine the wave-detection profile 232. The observation module 804 can determine the wave-detection profile 232 through each of the devices and corresponding instances of the tone-detection result 224. For example, the observation module 804 can determine the first-detection profile 226 from the first-detection result 226, the third-detection profile 236 from the third-detection result 228, the fourth-detection profile 238 from the fourth-detection result 230, or a combination thereof.

The observation module 804 can further process the tone-detection result 224 for instances of the transmission tone 202. For example, the observation module 804 can identify instances of the transmission tone 202, such as the first tone 204, the third tone 206, the fourth tone 208, or a combination thereof within each of the first-detection result 226, the third-detection result 228, the fourth-detection result 230, or a combination thereof.

Continuing with the example, the observation module 804 can further identify any shifts in frequency, such as a pattern of increase, decrease, or a combination thereof in received signals relative to one or more instances of the transmission tone 202. The observation module 804 can further process the shifts or changes around the known instances of frequencies, such as in the tone set 824 or known instances of the transmission characteristic 210, using a pattern, a threshold, or a combination thereof predetermined by the computing system 100.

Continuing with the example, the observation module 804 can determine the frequency shift 240 corresponding to receiving device, transmitted tone, or a combination thereof when the frequency samples match the predetermined pattern, threshold, or a combination thereof. As a more specific example, the observation module 804 can determine the first-detection first-shift 302 of FIG. 3, the first-detection third-shift 304 of FIG. 3, the first-detection fourth-shift 306 of FIG. 3, the third-detection first-shift 312 of FIG. 3, the third-detection third-shift 304 of FIG. 3, the third-detection fourth-shift 316 of FIG. 3, the fourth-detection first-shift 322 of FIG. 3, the fourth-detection third-shift 324 of FIG. 3, the fourth-detection fourth-shift 326 of FIG. 3, or a combination thereof with respect to the detecting device and the transmitted tone.

The observation module 804 can be further configured to identify the device-detail information 432 from the tone-detection result 224. For example, the observation module 804 can identify the device identification 436, the execution profile 438 of FIG. 4, the tone detail 440 of FIG. 4, or a combination thereof according to the detail information format 434 of FIG. 4 known or set by the computing system 100.

The observation module 804 can use the device identification 436 to identify or confirm the device transmitting the transmission tone 202. The observation module 804 can associate or link the device identification 436 with corresponding instances of the wave-detection profile 232. The observation module 804 can associate or link based on the device identification 436 and the transmission tone 202 or transmission characteristic 210 determined by the set-up module 802 or as identified in the device-detail information 432, such as within the transmission tone 202 or accompanying the transmission tone 202.

After determining the wave-detection profile 232, the control flow 800 can be passed to the movement module 806. The control flow 800 can pass similarly as described above between the set-up module 802 and the observation module 804, but using the processing results of the observation module 804, such as the wave-detection profile 232.

The movement module 806 is configured to process the command movement 218 or effects thereof. The movement module 806 can process the command movement 218 using the wave-detection profile 232. The movement module 806 can estimate or identify the user's physical movement for the command movement 218 using the wave-detection profile 232. The movement module 806 can estimate the command movement 218 associated with one or more devices. The movement module 806 can include a normalization module 840, a location module 842, a direction module 844, or a combination thereof for process the command movement 218.

The normalization module 840 is configured to account for variations in devices or components therein. For example, the normalization module 840 can remove variations in transmission strength, receiver capability, transmitter or detector location within a device, or a combination thereof.

The normalization module 840 can include a tone-normalization mechanism 846. The tone-normalization mechanism 846 is a protocol, a method, a sequence for communications, a frequency, or a combination thereof predetermined for removing device-specific influences or inaccuracies for the tone-detection result 224, the wave-detection profile 232, other related processes, or a combination thereof.

For example, the tone-normalization mechanism 846 can include one or more adjustment factors or methods corresponding to various instances of the device identification 436. The normalization module 840 can apply or use the factors or methods to process the tone-detection result 224, the wave-detection profile 232, other related processes, or a combination thereof.

Also for example, the tone-normalization mechanism 846 can include a calibrating method, result, or factor. The tone-normalization mechanism 846 can include instructions for utilizing the detecting portion of the transmitting device to detect, measure, and calibrate the transmissions.

As a more specific example, the transmitting device can use the microphone or receiver to detect and measure the transmission tone 202 generated by the transmitting device. The normalization module 840 can calculate the difference between intended instances of the transmission characteristic 210 and measured instances and apply or use the differences to process the tone-detection result 224, the wave-detection profile 232, other related processes, or a combination thereof.

The location module 842 is configured to identify physical locations of one or more devices in the computing system 100. The location module 842 can identify the physical locations by generating the relative-location profile 402 of FIG. 4. The relative-location profile 402 can be for processing the command movement 218 including calculating the command-movement direction 220 of FIG. 2. The location module 842 can generate the relative-location profile 402 for locating various devices, such as the first device 102, the third device 108, the fourth device 110, or a combination thereof, using a common reference, relative to each other, relative to a server, or a combination thereof.

The location module 842 can use a locating mechanism 848 for generating the relative-location profile 402. The locating mechanism 848 is a protocol, a method, a sequence of instructions, an equation, or a combination thereof predetermined for locating one or more devices using the transmission tone 202. The locating mechanism 848 can be for locating the one or more devices using the peer-to-peer format 820 relative to other devices including the reference device 410, using the server, such as the second device 106, or a combination thereof.

For example, the locating mechanism 848 can include a transmission time stamp, a transmission strength, or a combination thereof in the tone detail 440 for the peer-to-peer format 820. The locating mechanism 848 can determine the direction estimate 406 of FIG. 4, the distance estimate 408 of FIG. 4 between a transmitting device and a receiving device based on the tone detail 440.

As a more specific example, the locating mechanism 848 can use a difference in the transmitted time and a received time, a difference in the transmitted strength and a received strength, or a combination thereof. The locating mechanism 848 can include an equation or a method predetermined by the computing system 100 for performing the calculations. The locations can be represented by calculating the direction estimate 406, the distance estimate 408 from the reference device 410, from each other, or a combination thereof.

Continuing with the example, the locating mechanism 848 can further include triangulating locations of one or more devices using one or more instances of the transmission tone 202. The locations can be relatively based on one or more instances of devices within the connection area 412. The locations can also be relative to the reference device 410.

Also for example, the locating mechanism 848 can include a set of instructions for identifying location information for the first device 102, the third device 108, the fourth device 110, or a combination thereof using the server. The locating mechanism 848 can sent, receive, collect, store, or otherwise process, or a combination thereof for the location information from the first location unit 520 of FIG. 5, the third location unit 620 of FIG. 6, the fourth location unit 720 of FIG. 7, or a combination thereof. The locating mechanism 848 can collect and process the location information for the various devices at the server, such as the second device 106.

For further example, the locating mechanism 848 can include a method for utilizing a common or a known-stationary signal source, such as a router, a broadcasting device, an older device or a device incapable of utilizing the command-sense mechanism, or a combination thereof. The locating mechanism 848 can use the common or the known-stationary signal source as a different reference point, and utilize the communication signals from the different reference point to locate one or more devices within the connection area 412.

The location module 842 can generate the relative-location profile 402 using the locating mechanism 848. For example, the location module 842 can generate the relative-location profile 402 based on the peer-to-peer format 820 using one or more instances of the transmission tone 202 as described above. As a more specific example, the location module 842 can generate the relative-location profile 402 as the direction estimate 406, the distance estimate 408, or a combination thereof from the reference device 410 for all devices in the connection area 412. Also as a more specific example, each of the devices can have the direction estimate 406, the distance estimate 408, or a combination thereof of corresponding to each of the devices in within the connection area 412.

Continuing with the example, the locating mechanism 848 can further include sharing the results of the calculations between devices to further calculate or adjust the relative locations. As a more specific example, the first device 102 can share calculated results of the locations of the other devices in the relative-location profile 402 with the other devices. The other devices, such as the third device 108 or the fourth device 110, can use the relative-location profile 402 from the first device 102 or the reference device 410 to further calculate or adjust the location information, communicate the location information for the relative-location profile 402 back to the first device 102 or the reference device 410, or a combination thereof.

Also for example, the location module 842 can generate the relative-location profile 402 based on the location information communicated by each of the devices. As a more specific example, the location module 842 can generate the relative-location profile 402 by collecting or receiving, arranging, or a combination thereof for the location information from the first device 102, the third device 108, the fourth device 110, or a combination thereof. The location module 842 can collect or receive using the server, such as the second device 106, the reference device 410, or a combination thereof.

It has been discovered that the relative-location profile 402 based on multiple devices each utilizing unique instances of the transmission tone 202 and the locating mechanism 848 can provide improved accuracy in locating devices. The computing system 100 can calculate the locations for the relative-location profile 402 using methods utilizing finer granularity and higher signal fidelity than interacting with GPS. The computing system 100 can further calculate the locations with or without relying on the server for faster and more accurate real-time results.

It has been discovered that the relative-location profile 402 based on the transmission tone 202 and the corresponding instance of the tone-detection result 224 provides improved accuracy as described above without additional hardware equipment. The computing system 100 can calculate the relative-location profile 402 using the first user interface 530, the first communication unit 516, the third user interface 630, the third communication unit 616, the fourth user interface 730, the fourth communication unit 716, or a combination thereof. The computing system 100 can use existing microphones or wireless communication circuits on the devices, with or without location units, such as the first location unit 520, the third location unit 620, the fourth location unit 720, or a combination thereof.

The direction module 844 is configured to calculate the command-movement direction 220. The direction module 844 can calculate the command-movement direction 220 corresponding to the command movement 218. The direction module 844 can calculate the command-movement direction 220 relative to one or more of the devices in the computing system 100, such as the first device 102, the third device 108, the fourth device 110, or a combination thereof.

The direction module 844 can use the first communication unit 516, the second communication unit 536, the third communication unit 616, the fourth communication unit 716, the first control unit 512, the second control unit 534, the third control unit 612, the fourth control unit 712, or a combination thereof to calculate the command-movement direction 220 based on the wave-detection profile 232. The direction module 844 can use the frequency shift 240, the shift direction 242, the amplitude change 244, or a combination thereof for the overall tone or for the frequency shift 240, or a combination thereof. The direction module 844 can further use the responses detected at multiple devices with responses to multiple instances of the transmission tone 202.

For example, the direction module 844 can calculate the command-movement direction 220 as going from the device having the shift direction 242 for decreasing in frequency to the different device having the shift direction 242 for increasing in frequency. Also for example, the direction module 844 can calculate the command-movement direction 220 as going to, from, or a combination thereof for the device having the largest instance of the amplitude change 244 for the frequency shift 240, such as in broadest bandwidth change, highest intensity in the transmission tone 202 for the frequency shift 240, or a combination thereof.

The direction module 844 can calculate the command-movement direction 220 as going from the device having the transmission tone 202 with the frequency shift 240 for decrease in frequency or shifted to left according to the wave-detection profile 232 as shown in FIG. 3. For example, the command-movement direction 220 can be going away from the third device 108 based on the third-detection profile 236 as shown in FIG. 3.

The direction module 844 can calculate the command-movement direction 220 as going toward the device having the transmission tone 202 with the frequency shift 240 for increase in frequency or shifted to right according to the wave-detection profile 232 as shown in FIG. 3. For example, the command-movement direction 220 can be going toward the first device 102 and the fourth device 110 based on the first-detection profile 226 and the fourth-detection profile 238.

The direction module 844 can calculate the command-movement direction 220 as going toward or away from the device corresponding to the wave-detection profile 232, the transmission tone 202, or a combination thereof having the largest instance for the amplitude change 244 associated with the frequency shift 240. The direction module 844 can further calculate the command-movement direction 220 based on the relative-location profile 402, the device-detail information 432, the reference device 410, or a combination thereof.

For example, the command-movement direction 220 can be calculated as going from the third device 108 based on the third-detection profile 236, the third tone 206, or a combination thereof having the lowest drop in the frequency shift 240, the highest intensity in the frequency shift 240, or a combination thereof within the wave-detection profile 232. The command-movement direction 220 can be calculated as going toward the first device 102 based on the first-detection profile 226, the first tone 204, or a combination thereof having the highest increase in the frequency shift 240, the highest intensity in the frequency shift 240, or a combination thereof within the wave-detection profile 232.

The direction module 844 can compare the command-movement direction 220 to the direction estimate 406 of FIG. 4, the distance estimate 408 of FIG. 4, or a combination thereof. The direction module 844 can calculate the command-movement direction 220 based on the direction estimate 406, the distance estimate 408, or a combination thereof corresponding to one or more devices within the connection area 412.

It has been discovered that the command-movement direction 220 based on the wave-detection profile 232 provides increased usability. The computing system 100 can use the wave-detection profile 232 and the transmission tone 202 to calculate the command-movement direction 220. The command-movement direction 220 can be the essence of the command movement 218 and can be representative of user's natural or instinctive hand gestures. The command-movement direction 220 can enable recognition and integration of user's natural hand gestures as the command movement 218.

Also for example, the command-movement direction 220 can be calculated based on estimating the command movement 218 according to a known reference system. The direction module 844 can use the wave-detection profile 232, including the frequency shift 240 or the amplitude change 244 therein, according to a triangulation or a location method. The direction module 844 can use the relative-location profile 402 to establish the command-movement direction 220 using the location of the devices as the known reference system.

It has been discovered that the command-movement direction 220 relative to devices within the computing system 100 or the connection area 412 and using the relative-location profile 402 provides robustness against variability in device orientation. The frequency shift 240 or the shift direction 242 for calculating the command-movement direction 220 can be unaffected by orientation of the receiving or detecting device. The orientation-neutral characteristic of the frequency shift 240 can be used to describe the command-movement direction 220 in terms of to and from the devices.

Also for example, the command-movement direction 220 can be adjusted or calculated based on comparing the wave-detection profile 232 to the relative-location profile 402, such as by comparing an alignment among the devices with an estimated instance of the command-movement direction 220. The command-movement direction 220 can be toward all devices when all devices can be along a direction within a threshold, when all devices detect same value for the shift direction 242, or a combination thereof.

Also example, the command-movement direction 220 can be calculated based on the reference device 410, such as going toward or away therefrom. The command-movement direction 220 can be based on the reference device 410 since the user is likely interfacing with the reference device 410.

Also for example, the command-movement direction 220 can be calculated based on the device-detail information 432. The command-movement direction 220 can be calculated using the location information of the transmitting device or the relative-location profile 402 generated by the transmitting device. The location information can be used as described above for estimating the physical movement in the known reference system or for comparing and cross-checking as described above.

Continuing with the example, the command-movement direction 220 can also be calculated using the execution profile 438, and determine a likely starting point, a likely target point, or a combination thereof. The direction module 844 can determine the likely starting point, the likely target point, or a combination thereof based on the applications, the processes, the data or the file being accessed, or a combination thereof at the current time. The direction module 844 can include correlations between the applications, the processes, the data or the file being accessed, or a combination thereof and likely starting or target point relationship as predetermined by the computing system 100.

It has been discovered that the command-movement direction 220 and the execution profile 438 provides accurate identification of the command movement 218. The execution profile 438 can provide background information for capturing and identifying the situation and the likely intent of the user, allowing the computing system 100 to utilize the situation and the likely intent in estimating or understanding the command movement 218.

After processing the command movement 218, generating the relative-location profile 402, calculating the command-movement direction 220, or a combination thereof, the control flow 800 can be passed to the command module 808. The control flow 800 can pass similarly as described above between the set-up module 802 and the observation module 804, but using the processing results of the movement module 806, such as the command-movement direction 220.

The command module 808 is configured to identify user's commands and to execute associated commands. The command module 808 can include a decision module 850, an execution module 852, or a combination thereof for identifying and processing the user's commands.

The decision module 850 is configured to identify the gesture command 222. The decision module 850 can identify the gesture command 222 for operating one or more device for the computing system 100, such as the first device 102, the second device 106, the third device 108, the fourth device 110, or a combination thereof. The decision module 850 can identify the gesture command 222 for operating devices in relation to other devices. The decision module 850 can identify the gesture command 222 based on the command-movement direction 220 resulting from the wave-detection profile 232, the tone-detection result 224, or a combination thereof as described above.

The decision module 850 can identify the gesture command 222 by determining a source designation 854, a target designation 856, or a combination thereof. The source designation 854 is identification or a distinction for one or more device providing data or functionality associated with the user's command. The target designation 856 is identification or a distinction for one or more device receiving or incorporated with to or functionality associated with the user's command.

The decision module 850 can determine the source designation 854, the target designation 856, or a combination thereof based on the wave-detection profile 232, the command-movement direction 220, the gesture context 430, the relative-location profile 402, or a combination thereof. For example, the decision module 850 can determine the source designation 854 as the first device 102, the third device 108, the fourth device 110, or a combination thereof closest to the beginning of the command-movement direction 220 according to the relative-location profile 402. Also for example, the decision module 850 can determine the target designation 856 as the first device 102, the third device 108, the fourth device 110, or a combination thereof closest to the end of the command-movement direction 220 according to the relative-location profile 402.

For further example, the decision module 850 can determine the source designation 854, the target designation 856, or a combination thereof as one or more devices having the highest intensity in the frequency shift 240 or broadest bandwidth in the frequency shift 240 for the transmission tone 202 or the wave-detection profile 232 corresponding to the one or more devices. The source designation 854 can be based on the shift direction 242 indicating a drop in the frequency, and the target designation 856 can be based on the shift direction 242 indicating a rise in the frequency.

For further example, the decision module 850 can determine the source designation 854, the target designation 856, or a combination thereof based on the gesture context 430, the contextual factor 428, or a combination thereof. The decision module 850 can determine the source designation 854, the target designation 856, or combination thereof based on recognizing a specific scenario or a condition as indicated by the gesture context 430 including a status or a state, such as for power or mode value, elapsed time since interaction, application or process currently going, a state or a status associated with the application or process, a current location, a current time, or a combination thereof.

For further example, the decision module 850 can determine the source designation 854, the target designation 856, or a combination thereof based on the distance estimate 408, the direction estimate 406, or a combination thereof. The decision module 850 can determine the source designation 854, the target designation 856, or a combination thereof as one or more devices having the closest or lowest difference for the distance estimate 408, the direction estimate 406, or a combination thereof associated thereto with the command-movement direction 220. The decision module 850 can further determine the source designation 854, the target designation 856, or a combination thereof as one or more devices satisfying a threshold value predetermined by the computing system 100.

The decision module 850 can identify the gesture command 222 based on the gesture profile 416. The decision module 850 can identify the gesture command 222 by comparing the source designation 854, the target designation 856, the command-movement direction 220, the wave-detection profile 232, the gesture context 430, the relative-location profile 402, or a combination thereof to the gesture profile 416. The decision module 850 can identify an input requirement, such as the command-movement direction 220 or the gesture context 430, the corresponding response or function, a title or a category thereto, or a combination thereof as the gesture command 222.

For example, the decision module 850 can identify the gesture command 222 by comparing input data or processing results to the broadcast gesture 420, the exchange gesture 418, the execution gesture 422, or a combination thereof. As a more specific example, the decision module 850 can identify the broadcast gesture 420 based on identifying the command-movement direction 220 aligning with the devices according to the relative-location profile 402, the wave-detection profile 232 indicating same instances of the shift direction 242 occurring simultaneously for all devices, only one device showing a specific pattern of the shift direction 242 above a threshold, executing an application or a software associated with or compatible with the broadcast gesture 420 according to the gesture context 430, or a combination thereof as described by the gesture profile 416.

Also as a more specific example, the decision module 850 can identify the exchange gesture 418 based on identifying the command-movement direction 220, the wave-detection profile 232, the relative-location profile 402, or a combination thereof indicating that the user moved his or her arm from a direction or a location representing one device to a different direction or a different location representing a different device in the connection area 412 as described by the gesture profile 416. The decision module 850 can further identify the exchange gesture 418 based on identifying the gesture context 430 based on the contextual factor 428 such as specific applications executing on one or more device, current time, current location, or a combination thereof.

It has been discovered that the command-movement direction 220 and the relative-location profile 402 can provide variety of commands using natural hand gestures. The comparison between the command-movement direction 220 and the relative-location profile 402 can be used to distinguish between instances of the gesture profile 416, such as for recognizing the exchange gesture 418, the broadcast gesture 420, the execution gesture 422, or a combination thereof.

The decision module 850 can use the first communication unit 516, the second communication unit 536, the third communication unit 616, the fourth communication unit 716, the first control unit 512, the second control unit 534, the third control unit 612, the fourth control unit 712, or a combination thereof to identify the gesture command 222. The decision module 850 can store the gesture command 222 or any intermediate results associated thereto in the first storage unit 514, the second storage unit 546, the third storage unit 614, the fourth storage unit 714, or a combination thereof.

The execution module 852 is configured to respond to the command movement 218. The execution module 852 can execute the gesture command 222 corresponding to the estimation of the command movement 218 based on the transmission tone 202, the tone-detection result 224, the wave-detection profile 232, or a combination thereof as described above.

The execution module 852 can execute the gesture command 222 by determining, sending, and executing one or more steps or instructions corresponding to the gesture command 222. The execution module 852 can determine, send, and execute steps or instructions specific to or separately between one or more devices corresponding to the source designation 854, the target designation 856, or a combination thereof. The execution module 852 can include one or more instructions or steps corresponding to various values of the gesture command 222, specific to or for devices having the source designation 854, the target designation 856, or a combination thereof predetermined by the computing system 100.

For example, the execution module 852 can execute the gesture command 222 corresponding to the exchange gesture 418, the broadcast gesture 420, the execution gesture 422, or a combination thereof. As a more specific example, the execution module 852 can determine instructions or steps for selecting and transmitting corresponding to the broadcast gesture 420 to the first device 102 determined as the source designation 854 and the reference device 410. The execution module 852 can determine instructions or steps for receiving, displaying, and continue processing to the third device 108, the fourth device 110, other devices in the connection area 412, or a combination thereof.

Also as a more specific example, the execution module 852 can execute the exchange gesture 418 can determine instructions or steps for selecting and transmitting content or process information from the device determined as the source designation 854, the reference device 410, or a combination thereof. The execution module 852 can determine instructions or steps for receiving, displaying, and continue processing for the device determined as the target designation 856.

The execution module 852 can further communicate the source designation 854, the target designation 856, the gesture command 222, the wave-detection profile 232, the command-movement direction 220, the gesture context 430, or a combination thereof to one or more devices in the connection area 412. The execution module 852 can identify and execute instructions through the devices receiving the information.

The execution module 852 can use the first communication unit 516, the second communication unit 536, the third communication unit 616, the fourth communication unit 716, or a combination thereof to communicate information for devices corresponding to the source designation 854, the target designation 856, or a combination thereof. The execution module 852 can use the first control unit 512, the second control unit 534, the third control unit 612, the fourth control unit 712, or a combination thereof to execute the corresponding instructions or steps.

It has been discovered that the command-movement direction 220, the execution profile 438, the reference device 410, and the gesture context 430 based on the contextual factor 428 provides contextually relevant interaction for the user. The command-movement direction 220, the reference device 410, and the gesture context 430 can be used to capture and identify the situation and the likely intent of the user, allowing the computing system 100 to recognize and respond accordingly.

The modules described in this application can be hardware implementation or hardware accelerators, including passive circuitry, active circuitry, or both, in first communication unit 516, the second communication unit 536, the third communication unit 616, the fourth communication unit 716, the first control unit 512, the second control unit 534, the third control unit 612, the fourth control unit 712, or a combination thereof. The modules can also be hardware implementation or hardware accelerators, including passive circuitry, active circuitry, or both, within the first device 102, the second device 106, the third device 108, or the fourth device 110, but outside of the first communication unit 516, the second communication unit 536, the third communication unit 616, the fourth communication unit 716, the first control unit 512, the second control unit 534, the third control unit 612, or the fourth control unit 712.

For illustrative purposes, the various modules have been described as being specific to the first device 102, the second device 106, the third device 108, or the fourth device 110. However, it is understood that the modules can be distributed differently. For example, the various modules can be implemented in a different device, or the functionalities of the modules can be distributed across multiple devices. Also as an example, the various modules can be stored in a non-transitory memory medium As a more specific example, one or more modules described above can be stored in the non-transitory memory medium for distribution to a different system, a different device, a different user, or a combination thereof. Also as a more specific example, the modules described above can be implemented or stored using a single hardware unit, such as a chip or a processor, or across multiple hardware units.

The modules described in this application can be stored in the non-transitory computer readable medium. The first storage unit 514, the second storage unit 546, the third storage unit 614, the fourth storage unit 714, or a combination thereof can represent the non-transitory computer readable medium. The first storage unit 514, the second storage unit 546, the third storage unit 614, the fourth storage unit 714, or a combination thereof, or a portion therein can be removable from the first device 102, the second device 106, the third device 108, or the fourth device 110. Examples of the non-transitory computer readable medium can be a non-volatile memory card or stick, an external hard disk drive, a tape cassette, or an optical disk.

The physical transformation from the wave-detection profile 232, the command-movement direction 220, the contextual factor 428, or a combination thereof results in the movement in the physical world, such as files shared or displayed on other devices, forming coupling between devices, controlling functions across multiple devices, or a combination thereof. The file, the coupling, the function, or a combination thereof can influence the user's movement, such as interacting with a different device or multiple devices. Movement in the physical world results in changes to the contextual factor 428 and the transmission tone 202, which can be fed back into the computing system 100 to further process the wave-detection profile 232.

The control flow 800 or the method 800 of operation of the computing system 100 includes: identifying a tone-detection result for representing a transmission tone received at a device; determining a wave-detection profile including a frequency shift based on the tone-detection result; calculating a command-movement direction based on the wave-detection profile for representing the command-movement direction relative to the device and a further device; and identifying a gesture command based on the command-movement direction for operating the device relative to the further device including displaying on the device.

As an example of the control flow 800, the first device 102, the second device 106, the third device 108, the fourth device 110, or a combination thereof can include an application, a hardware implementation, or a combination thereof for the set-up module 802, the observation module 804, the movement module 806, the command module 808, or a combination thereof for processing the gesture command 222. The application, the hardware implementation, or a combination thereof can function differently on the consumer device, such as the first device 102, the third device 108, the fourth device 110, or a combination thereof, than the server, such as the second device 106, to perform device coupling and file sharing.

Continuing with the example, the application, the hardware implementation, or a combination thereof on one or more of the consumer devices can capture a bandwidth variation through the tone-detection result 224 and the wave-detection profile 232 for performing the process for recognizing the gesture command 222. The application, the hardware implementation, or a combination thereof can have the consumer device communicate with the server based on determining the frequency shift 240.

Continuing with the example, the server can initiate a connection between the consumer devices corresponding to the wave-detection profile 232 and store the device identification 436 for the corresponding devices. After the consumer devices are coupled, the corresponding consumer devices can communicate a status message with the user for indicating successful coupling or successful transfer of data. The user can then use or access the data or functionalities across the coupled devices. The user can further transfer the content using the same instance of the command movement 218 as used for the coupling process.

Also as an example of the control flow 800, the consumer device can include multiple portions for capturing the transmission tone 202. As a more specific example, the consumer device can include multiple microphones located at different portions thereof, such as on the reference top portion 424 and the reference bottom portion 426. The computing system 100 can use the multiple microphones to further adapt to a posture or an orientation of the consumer device.

It has been discovered that the wave-detection profile 232 utilizing multiple microphones on the consumer device provides increased accuracy in recognizing the gesture command 222 and increased robustness. The multiple microphones can create a reception angle covering 360 degrees about the consumer device along all planes, which can allow recognition of the gesture command 222 to be orientation agnostic to be adaptive to various phone postures and environment agnostic for recognizing the gesture command 222 indoor, outdoor, and "on the go".

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
   an input-output unit configured to identify a tone-detection result and a further detection result at a server for representing one or more transmission tones received at a user device and a further user device;
   a control unit, coupled to the input-output unit, configured to:
   determine a wave-detection profile including a frequency shift based on comparing the tone-detection result and the further detection result,
   determine a command-movement direction based on the wave-detection profile for representing the command-movement direction relative to the user device and the further user device, both separate from the server,
   create a link at the server based on the command-movement direction for coupling the user device with one or more of the further user device and another device, and
   identify a gesture command associated with the link based on the command-movement direction for operating the user device, the further user device, or a combination thereof according to the gesture command.

2. The system as claimed in claim 1 wherein:
   the input-output unit is configured to identify the tone-detection result for representing the tone-detection result corresponding to the further user device and a different device;
   the control unit is configured to:
   determine the wave-detection profile including the frequency shift corresponding to the further user device and the different device,
   calculate the command-movement direction for representing the command-movement direction relative to the user device, the further user device, and the different device,
   create the link at the server based on the command-movement direction for coupling the user device, the further user device, the different device, or a combination thereof, and
   identify the gesture command for operating the user device, the further user device, the different device, or a combination thereof.

3. The system as claimed in claim 1 wherein the control unit is configured to:
   identify the gesture command corresponding to a broadcast gesture; and
   execute the gesture command corresponding to the broadcast gesture.

4. The system as claimed in claim 1 wherein the control unit is configured to generate a relative-location profile for locating the user device and the further user device for calculating the command-movement direction.

5. The system as claimed in claim 1 wherein the control unit is configured to:
   identify a device-detail information from the tone-detection result; and
   calculate the command-movement direction based on the device-detail information.

6. The system as claimed in claim 1 wherein:
   the input-output unit is configured to identify the tone-detection result for representing a tone corresponding to the user device, a further tone different from the tone and corresponding to the further user device, a different tone different from both the tone and the further tone and corresponding to a different device; and the control unit is configured to determine the wave-detection profile including the frequency shift and an amplitude change, both corresponding to the tone, the further tone, the different tone, or a combination thereof.

7. The system as claimed in claim 6 wherein the control unit is configured to generate a relative-location profile for locating the user device, the further user device, and the different device for calculating the command-movement direction.

8. The system as claimed in claim 6 wherein the control unit is configured to:
determine a gesture context associated with the command-movement direction; and
identify the gesture command based on the gesture context.

9. The system as claimed in claim 6 wherein the input-output unit is configured to identify the tone-detection result for representing the tone determined using a peer-to-peer format through communication between the user device, the further user device, the different device, or a combination thereof within a connection area.

10. The system as claimed in claim 6 wherein the input-output unit includes a communication unit configured to receive the tone-detection result for identifying the gesture command with the server.

11. A method of operation of a computing system comprising:
identifying a tone-detection result and a further detection result at a server for representing one or more transmission tones received at a user device and a further user device;
determining a wave-detection profile including a frequency shift based on comparing the tone-detection result and the further detection result;
determining a command-movement direction based on the wave-detection profile for representing the command-movement direction relative to the user device and the further user device, both separate from the server;
creating a link at the server based on the command-movement direction for coupling the user device with one or more of the further user device and another device; and
identifying a gesture command associated with the link based on the command-movement direction for operating the user device, the further user device, or a combination thereof according to the gesture command.

12. The method as claimed in claim 11 wherein:
identifying the tone-detection result includes identifying the tone-detection result for representing the tone-detection result corresponding to the further user device and a different device;
determining the wave-detection profile includes determining the wave-detection profile including the frequency shift corresponding to the further user device and the different device;
determining the command-movement direction includes calculating the command-movement direction for representing the command-movement direction relative to the user device, the further user device, and the different device;
creating the link includes creating the link based on the command-movement direction for coupling the user device, the further user device, the different device, or a combination thereof; and
identifying the gesture command includes identifying the gesture command for operating the user device, the further user device, the different device, or a combination thereof.

13. The method as claimed in claim 11 wherein:
identifying the gesture command includes identifying the gesture command corresponding to a broadcast gesture; and
further comprising:
executing the gesture command corresponding to the broadcast gesture.

14. The method as claimed in claim 11 further comprising generating a relative-location profile for locating the user device and the further user device for calculating the command-movement direction.

15. The method as claimed in claim 11 further comprising:
identifying a device-detail information from the tone-detection result; and
wherein:
determining the command-movement direction includes calculating the command-movement direction based on the device-detail information.

16. A non-transitory computer readable medium including instructions for operating a computing system comprising:
identifying a tone-detection result and a further detection result at a server for representing one or more transmission tones received at a user device and a further user device;
determining a wave-detection profile including a frequency shift based on comparing the tone-detection result and the further detection result;
determining a command-movement direction based on the wave-detection profile for representing the command-movement direction relative to the user device and the further user device, both separate from the server;
creating a link at the server based on the command-movement direction for coupling the user device with one or more of the further user device and another device; and
identifying a gesture command associated with the link based on the command-movement direction for operating the user device, the further user device, or a combination thereof according to the gesture command.

17. The non-transitory computer readable medium as claimed in claim 16 wherein:
identifying the tone-detection result includes identifying the tone-detection result for representing the tone-detection result corresponding to the further user device and a different device;
determining the wave-detection profile includes determining the wave-detection profile including the frequency shift corresponding to the further user device and the different device;
determining the command-movement direction includes calculating the command-movement direction for representing the command-movement direction relative to the user device, the further user device, and the different device;
creating the link includes creating the link based on the command-movement direction for coupling the user device, the further user device, the different device, or a combination thereof; and identifying the gesture command includes identifying the gesture command for operating the user device, the further user device, the different device, or a combination thereof.

18. The non-transitory computer readable medium as claimed in claim 16 wherein:

identifying the gesture command includes identifying the gesture command corresponding to a broadcast gesture; and the instructions further comprising:

executing the gesture command corresponding to the broadcast gesture.

19. The non-transitory computer readable medium as claimed in claim 16, the instructions further comprising generating a relative-location profile for locating the user device and the further user device for calculating the command-movement direction.

20. The non-transitory computer readable medium as claimed in claim 16, the instructions further comprising:

identifying a device-detail information from the tone-detection result; and wherein:

determining the command-movement direction includes calculating the command-movement direction based on the device-detail information.

\* \* \* \* \*